(12) United States Patent
Sekita

(10) Patent No.: US 11,215,135 B2
(45) Date of Patent: Jan. 4, 2022

(54) FUEL INJECTION CONTROL DEVICE FOR ENGINE

(71) Applicant: MAHLE ELECTRIC DRIVES JAPAN CORPORATION, Shizuoka-ken (JP)

(72) Inventor: Tomoaki Sekita, Numazu (JP)

(73) Assignee: MAHLE ELECTRIC DRIVES JAPAN CORPORATION, Shizuoka-Ken (JP)

( * ) Notice: Subject to any disclaimer, the term of this patent is extended or adjusted under 35 U.S.C. 154(b) by 47 days.

(21) Appl. No.: 16/772,896

(22) PCT Filed: Dec. 20, 2017

(86) PCT No.: PCT/JP2017/045757
§ 371 (c)(1),
(2) Date: Jun. 15, 2020

(87) PCT Pub. No.: WO2019/123576
PCT Pub. Date: Jun. 27, 2019

(65) Prior Publication Data
US 2020/0309058 A1 Oct. 1, 2020

(51) Int. Cl.
*F02D 41/34* (2006.01)
*F02D 41/06* (2006.01)
(Continued)

(52) U.S. Cl.
CPC ........... *F02D 41/34* (2013.01); *F02D 41/062* (2013.01); *F02D 41/123* (2013.01);
(Continued)

(58) Field of Classification Search
CPC .... F02D 41/047; F02D 41/062; F02D 41/064; F02D 41/068; F02D 41/065; F02D 41/061; F02D 41/06; F02D 41/067
See application file for complete search history.

(56) References Cited

U.S. PATENT DOCUMENTS 5,394,857 A * 3/1995 Yamakawa ........... F02D 41/065
123/491
5,852,998 A * 12/1998 Yoshioka .............. F02D 41/062
123/491
(Continued)

FOREIGN PATENT DOCUMENTS

JP 03145531 6/1991
JP 06307270 11/1994
(Continued)

OTHER PUBLICATIONS

International Search Report for PCT/JP2017/045757, dated Jan. 23, 2018.

*Primary Examiner* — Sizo B Vilakazi
(74) *Attorney, Agent, or Firm* — Pearne & Gordon LLP

(57) ABSTRACT

Provided is a fuel injection control device that makes it possible to precisely estimate an amount of fuel remaining in an air intake passage at a start-up of an engine, and to precisely set an fuel injection amount during start-up operation. In the fuel injection control device of the present invention, in a process in which the engine is transferred from operation state to a stop state, engine stop information is acquired and stored in a nonvolatile memory, the engine stop information including, at least an information indicating whether the current engine stop is an intended stop accompanied by fuel cutting. During the start-up of the engine, judgement is made as to whether the last engine stop was the intended stop or not, based upon the engine stop information and a fuel injection amount during start-up operation is determined with reference to the result of the judgement.

20 Claims, 5 Drawing Sheets

(51) Int. Cl.
  *F02D 41/12*   (2006.01)
  *F02D 41/24*   (2006.01)
  *F02D 41/26*   (2006.01)

(52) U.S. Cl.
  CPC ..... *F02D 41/2441* (2013.01); *F02D 41/2451* (2013.01); *F02D 41/26* (2013.01); *F02D 2200/021* (2013.01); *F02D 2200/0404* (2013.01); *F02D 2200/0406* (2013.01); *F02D 2200/101* (2013.01)

(56) References Cited

U.S. PATENT DOCUMENTS

| | | | |
|---|---|---|---|
| 10,156,217 B2 * | 12/2018 | Shoda | F02D 17/04 |
| 2015/0252771 A1 * | 9/2015 | Shoda | F02D 17/04 |
| | | | 123/445 |

FOREIGN PATENT DOCUMENTS

| | | |
|---|---|---|
| JP | 09256887 | 9/1997 |
| JP | 10280989 | 10/1998 |
| JP | 0216345 | 1/1999 |
| JP | 2011220176 | 11/2011 |
| JP | 2014227937 | 12/2014 |
| JP | 2015-40524 | 3/2015 |
| WO | 2014064838 | 9/2016 |

\* cited by examiner

FIG. 5

| ENGINE TEMPERATURE DIFFERENCE(°C) | CORRECTION COEFFICIENT |
|---|---|
| 0 | 0.8 |
| 5 | 0.9 |
| 10 | 0.95 |
| 20 | 1 |

FIG. 6

| | | STOPPING ENGINE ROTATIONAL SPEED (r/min) | | | | |
| --- | --- | --- | --- | --- | --- | --- |
| | | 1000 (r/min) | 2000 (r/min) | 3000 (r/min) | 4000 (r/min) | |
| ENGINE TEMPERATURE DIFFERENCE(°C) | 0 (°C) | 0.6 | 0.5 | 0.4 | 0.3 | CORRECTION COEFFICIENT |
| | 5 (°C) | 0.7 | 0.6 | 0.5 | 0.4 | |
| | 10 (°C) | 0.8 | 0.7 | 0.6 | 0.5 | |
| | 15 (°C) | 0.9 | 0.8 | 0.7 | 0.6 | | ered so that when the engine is intentionally stopped, fuel
FUEL INJECTION CONTROL DEVICE FOR ENGINE

TECHNICAL FIELD

The present invention relates to a fuel injection control device for controlling fuel injection in an engine (internal combustion engine) to which fuel is supplied by an injector.

BACKGROUND ART

In an engine to which fuel is supplied by an injector, fuel that has been injected into an air intake passage of the engine from the injector is charged into a cylinder together with suctioned air while adhering to, inter alia, a wall surface of the air intake passage and forming a liquid film. Most of the fuel injected from the injector when the engine is started up is first used to form a liquid film on an inner surface of the air intake passage, and therefore at first only some of the fuel that is injected reaches the interior of the cylinder. Therefore, in this type of engine, a start-up-amount-increasing control is performed to increase a start-up fuel injection amount so as to be greater than a fuel injection amount during steady operation. An optimal rate at which the start-up fuel injection amount increases depends on an amount of fuel that has adhered to the inner surface of the air intake passage at the last engine stop, an engine temperature at the last engine stop, a period of time elapsed from the last engine stop to the current start-up of the engine, etc.

In cases where the engine is restarted immediately after stopping, it is necessary to reduce the increasing rate of the start-up injection amount because a remaining amount of fuel adhered to the inner surface of the air intake passage on the start-up is high, but in cases where the engine is restarted in a state in which an extended period of time has elapsed after the last engine stop, it is necessary to raise the increasing rate in the start-up fuel injection amount because the amount of fuel adhered to the inner surface of the air intake passage on the start-up is low. In addition, in cases where the engine has stopped in a state in which the engine has not finished warming up, it is necessary to reduce the increasing rate of the start-up injection amount because most of the fuel remains in the air intake passage when the engine is restarted, but in cases where the engine has stopped in a state in which the engine has finished warming up, it is necessary to raise the increasing rate of the start-up injection amount because the remaining amount of fuel in the air intake passage when the engine is restarted is low.

As indicated in Patent Document 1, a configuration has been presented in which, when the engine is restarted immediately after being stopped, it is estimated whether the engine had finished warming up at the last engine stop, the estimation being conducted on the basis of an engine temperature at the time of the restart, and the increasing rate of the fuel injection amount is caused to be different for cases where the engine has finished warming up at the last engine stop than for cases where the engine had not finished warming up at the last engine stop.

PRIOR ART DOCUMENTS

Patent Documents

[Patent Document 1] Japanese Laid-open Patent Application No. 2015-40524

DISCLOSURE OF THE INVENTION

Problems to be Solved by the Invention

An amount of fuel remaining in an air intake passage during start-up of an engine varies depending not only on an engine temperature at the last engine stop and a period of time elapsed from the last engine stop to the restart of the engine, but also on whether or not fuel cutting has been performed at the last engine stop.

In cases where an engine stop is an intended stop caused by manipulation of an engine stop switch, or caused by a protection control performed in order to protect the engine or a load thereof, fuel cutting is typically performed upon the engine stop. In such cases, most of the fuel in the air intake passage is discharged due to scavenging performed until the engine stops after fuel cutting, and therefore the amount of fuel remaining in the air intake passage when the engine is restarted is low. However, in cases where the last engine stop was an unintended stop caused by insufficiency of output torque of the engine, the engine is stopped without accompanying fuel cutting, and therefore most of the fuel remains in the air intake passage after the engine stop.

Because the amount of fuel remaining in the air intake passage when the engine is started up varies depending not only on the period of time elapsed from the last engine stop to the restart of the engine and the engine temperature at the last engine stop, but also on whether or not the last engine stop was the intended stop accompanied by fuel cutting, as described above, it is impossible to precisely determine an fuel injection amount during start-up operation merely by judging whether or not the engine had finished warming up at the last engine stop as indicated in Patent Document 1.

An object of the present invention is to provide an engine fuel injection control device that makes it possible to estimate circumstances at the last engine stop more precisely than in the prior art, and to more precisely control an fuel injection amount during start-up operation.

Means to Solve the Problems

The present invention is applied to a fuel injection control device provided with an injection amount determination means for determining a fuel injection amount for an engine to which fuel is supplied by an injector, and an injector drive unit for driving the injector so as to cause fuel in the amount determined by the injection amount determination means to be injected from the injector. The fuel injection control device to which the present invention is applied is configured so that when the engine is intentionally stopped, fuel cutting for stopping the injection of fuel from the injector is performed.

The fuel injection control device according to the present invention is provided with an engine stop information acquisition means that, in a process in which the engine is transferred from an operation state to a stop state, acquires an engine stop information that includes, at least an engine stopping state information indicating whether or not a state of stop of current engine stop is an intended stop accompanied by fuel cutting, and stores the engine stop information in a nonvolatile memory. The injection amount determination means is configured so as to perform, when the engine is started up, a judgement as to whether the last engine stop was the intended stop or not, based upon the engine stop information stored in the nonvolatile memory, and then determine a fuel injection amount during start-up operation in which a result of the judgement is reflected.

In this specification, the term "fuel cutting" refers to stopping injection of fuel from the injector in order to stop the engine, i.e., stopping injection of fuel from the injector that is to be performed at a prescribed injection timing and stopping the supply of fuel to the engine in order to stop the engine.

In this specification, the wording "intended stop" or "intentional stop" of the engine refers to stopping the engine according to intention of a driver or for a purpose of protecting a specific object to be protected, and the wording "unintended stop of the engine" refers to unexpected engine stop due to insufficient torque, etc.

In this specification, the wording "engine stopping state information" refers to an information indicating whether or not the engine stop was the intended stop. This information can be in one of two states, i.e., a state indicating that the engine stop was the intended stop and a state indicating that the engine stop was not the intended stop.

The wording "engine stop information" refers to information about the engine, this information being acquired in a process in which the engine is transferred from an operation state to a stop state. In the present invention, it is fundamental that at least the engine stopping state information is included in the engine stop information. However, in order to make it possible to precisely determine the fuel injection amount during start-up operation, the engine stop information can also include other information that is useful when determining an engine restarting fuel injection amount from the information about the engine, the information being acquirable in the process in which the engine is transferred from an operating state to a stop state.

As described above, when the fuel injection control devise is configured so that, in a process in which the engine is transferred from an operating state to a stop state, the engine stop information that includes, at least, the engine stopping state information indicating whether or not the current engine stop is the intended stop accompanied by fuel cutting is acquired, and the engine stop information is stored in a nonvolatile memory, and during start-up of the engine, a judgement as to whether the last engine stop was the intended stop or not is performed from the engine stopping state information stored in the nonvolatile memory, and then a fuel injection amount during start-up operation in which the result of the judgement is reflected is determined, it is possible to more precisely determine the fuel injection amount during start-up operation and improve start-up properties of the engine.

In cases where the last engine stop was the intended stop accompanied by fuel cutting, the amount of fuel remaining in the air intake passage when the engine is started up is usually slight, but in cases where the last engine stop was the unintended stop not accompanied by fuel cutting, considerable amount of fuel often remains in the air intake passage when the engine is started up. Therefore, the injection amount determination means is preferably configured so as to determine the fuel injection amount during start-up operation such that an fuel injection amount during start-up operation determined when it has been judged from the engine stopping state information stored in the nonvolatile memory that the last engine stop was not the intended stop is less than an fuel injection amount during start-up operation determined when it has been judged that the last engine stop was the intended stop.

The judgement of whether the last engine stop was the intended stop or not can be performed by confirming whether the stop prediction information has been detected before the engine is transferred from the operation state to the stopped state, where the stop prediction information is information obtained only in cases where the engine stop is the intended stop. In a preferred embodiment of the present invention, there is provided a stop prediction information detection means for detecting, as the stop prediction information, information generated only in cases where the engine is stopped intentionally. In such cases, the engine stop information acquisition means is configured so that when it is confirmed that the stop prediction information detection means has detected the stop prediction information before the engine stop, an information indicating that the current engine stop is the intended stop is stored in the nonvolatile memory as the engine stopping state information, and moreover is configured so that when it cannot be confirmed that the stop prediction information detection means has detected the stop prediction information before the engine stop, an information indicating that the current engine stop is not the intended stop is stored in the nonvolatile memory as the engine stopping state information.

The stop prediction information detection means can be configured so as to use, as the stop prediction information, an information indicating that an engine stop command generated due to manipulation of a switch, etc., has been generated, and/or an information indicating that an engine stop control to be executed when an engine stop command is generated has been activated. In cases where there is provided with a protection control means that performs a protection control in which fuel cutting is performed to stop the engine in order to protect a specific object to be protected, the stop prediction information detection means may be configured so as to use the information indicating that the protection control has been activated as the stop prediction information.

In the fuel injection control device to which the present invention is applied, fuel cutting is necessarily performed when the engine is intentionally stopped. Therefore, the stop prediction information detection means can be configured so as to use the information indicating that a process for performing fuel cutting has started as the stop prediction information.

Because fuel remaining in the air intake passage of the engine when the engine is stopped vaporizes over time, the amount of fuel remaining in the air intake passage of the engine decreases over time after the engine has stopped. Therefore, when determining the fuel injection amount in consideration of the amount of fuel remaining in the air intake passage when the engine is started up, it is preferable to consider a length of a period of time from when the engine is stopped until when the engine is restarted.

In a preferred embodiment of the present invention, the engine stop information acquisition means is configured so that an information about engine temperature at engine stop, which is engine temperature when rotating engine is stopped, is stored in the nonvolatile memory as the engine stop information. In this case, the injection amount determination means determines the fuel injection amount during start-up operation so that the fuel injection amount during start-up operation becomes larger as a magnitude of an engine temperature difference derived by subtracting an engine temperature at start-up of the engine from the engine temperature at engine stop becomes larger, both in cases where it has been judged that the last engine stop was the intended stop, and in cases where it has been judged that the last engine stop was not the intended stop.

As described above, when a configuration is adopted in which the information about the engine temperature at engine stop is included in the engine stop information, and in which the fuel injection amount during start-up operation is determined so that the fuel injection amount during start-up operation becomes larger as the magnitude of the engine temperature difference derived by subtracting the engine temperature at start-up of the engine from the engine temperature at engine stop becomes larger, it is possible to reflect, in the injection amount during start-up operation, changes in the amount of fuel remaining in the air intake passage that occur during a period from when the engine is stopped until when the engine is restarted, therefore making it possible to more precisely determine the fuel injection amount during the start-up operation.

In a preferred embodiment of the present invention, there is provided with an engine temperature detector for detecting temperature of the engine, and means for detecting remaining fuel amount correlation data that is correlated with an amount of fuel remaining in an air intake passage of the engine in cases where stop of the engine is not the intended stop. In this case, the engine stop information acquisition means is configured so that in cases where it has been judged from the engine stopping state information that the current engine stop is the intended stop, the information about the engine temperature at engine stop, which is the engine temperature detected by the engine temperature detector when rotating engine is stopped, is stored in the nonvolatile memory as the engine stop information, and moreover is configured so that in cases where it has been judged from the engine stopping state information that the current engine stop is not the intended stop, the information about the engine temperature at engine stop and the remaining fuel amount correlation data is stored in the nonvolatile memory as the engine stop information. In this case, an engine temperature difference is derived by subtracting the engine temperature at present from the engine temperature at the last engine stop, and the injection amount determination means is configured so as to determine the fuel injection amount during start-up operation with respect to the engine temperature difference so that the fuel injection amount during start-up operation becomes larger as the magnitude of the engine temperature difference becomes larger, in cases where it has been judged from the engine stopping state information stored in the nonvolatile memory that the last engine stop is the intended stop, and moreover is configured so as to determine the fuel injection amount during start-up operation with respect to the engine temperature difference and the remaining fuel amount correlation data so that the fuel injection amount during start-up operation becomes larger as the magnitude of the engine temperature difference becomes larger and the fuel injection amount during start-up operation becomes smaller as the magnitude of the remaining fuel amount estimated from the remaining fuel amount correlation data becomes larger in cases where it has been judged from the engine stopping state information stored in the nonvolatile memory that the last engine stop was not the intended stop.

In cases where the stop of the engine is the intended stop, the amount of fuel remaining in the air intake passage is low due to scavenging performed along with rotation of the engine until the engine stops after fuel cutting is started. A number of instances of scavenging performed after fuel cutting is started is larger as the engine rotational speed at time when fuel cutting is started is higher. Therefore, the amount of fuel remaining in the air intake passage when the engine is stopped in cases where the stop of the engine is the intended stop is less than that in cases where the engine rotational speed is high at time when fuel cutting is started. In such cases, it is possible to use the engine rotational speed at time when fuel cutting is started as the remaining fuel amount correlation data. However, because the amount of fuel remaining in the air intake passage when rotating engine is stopped is slight in cases where the stop of the engine is the intended stop, mainly the engine temperature difference is to be considered in most cases when determining the fuel injection amount during start-up operation, and the necessity of considering the remaining fuel amount correlation data is lower than the necessity of considering the engine temperature difference in such cases.

Data about a rotational speed detected near the timing at which fuel cutting is started can be used as data about the "engine rotational speed at time when fuel cutting is started." Data about a rotational speed detected at the timing at which fuel cutting is started can be used as a matter of course, but data about a rotational speed detected immediately before fuel cutting is started and data about a rotational speed detected immediately after fuel cutting is started may also be used.

By contrast, in cases where engine stop is not the intended stop, a certain amount of fuel remains in the air intake passage at time when the engine is stopped because the engine is instantly transferred from an operating state to a stop state without fuel cutting being performed. Therefore, in cases where the last engine stop is not the intended stop, it is preferable to use not only the engine temperature at engine stop but also other appropriate data that is correlated with the amount of fuel remaining in the air intake passage of the engine when rotating engine is stopped as the remaining fuel amount correlation data, and to determine the fuel injection amount during start-up operation in consideration of this data.

It is possible to use stopping engine rotational speed that is the engine rotational speed detected immediately before the engine stop, a fuel injection amount in fuel injection performed immediately before the engine stop, a throttle valve position detected immediately before the engine stop, a negative pressure in an air intake pipe of the engine as detected immediately before the engine stop, etc., as the remaining fuel amount correlation data used in cases where it has been judged that the last engine stop is not the intended stop.

In cases where the engine is stopped unexpectedly due to insufficient torque, etc., generally the engine is abruptly stopped from a state of rotating at a somewhat high rotational speed. Therefore, the rotational speed detected immediately before the engine stop in cases where stop of the engine is not the intended stop is a somewhat high rotational speed detected near a timing at which the transition of the engine from the driving state to the stopped state has started, rather than being close to zero.

Other embodiments of the present invention are clarified in the descriptions about Embodiments for Carrying Out the Invention below.

Advantageous Effects of the Invention

According to the present invention, as a configuration is adopted in which attention is given to a feature in which an amount of fuel remaining in an air intake pipe of an engine during start-up of the engine is different for cases where state of the last engine stop was the intended stop than for cases where state of the last engine stop was not the intended stop, a judgement is made as to whether the last engine stop is the intended stop or not when determining a fuel injection amount for use during start-up of the engine, and the result of the judgement is reflected to determine an fuel injection amount during start-up operation, it is possible to more precisely determine the fuel injection amount for use during start-up of the engine and to improve start-up properties of the engine.

BRIEF DESCRIPTION OF THE DRAWINGS

FIG. 5 is a diagram showing an example of a structure of a map for operating a correction coefficient, the map being used when operating a correction coefficient used in order to derive the fuel injection amount during start-up operation in cases where the lase engine stop was the intended stop in the fuel injection control device shown in FIG. 2; and FIG. 6 is a diagram showing an example of a structure of a map for operating a correction coefficient, the map being used when operating the correction coefficient used in order to derive the fuel injection amount during start-up operation in cases where the last engine stop was not the intended stop in the fuel injection control device shown in FIG. 2.

EMBODIMENTS FOR CARRYING OUT THE INVENTION

Figure 1:
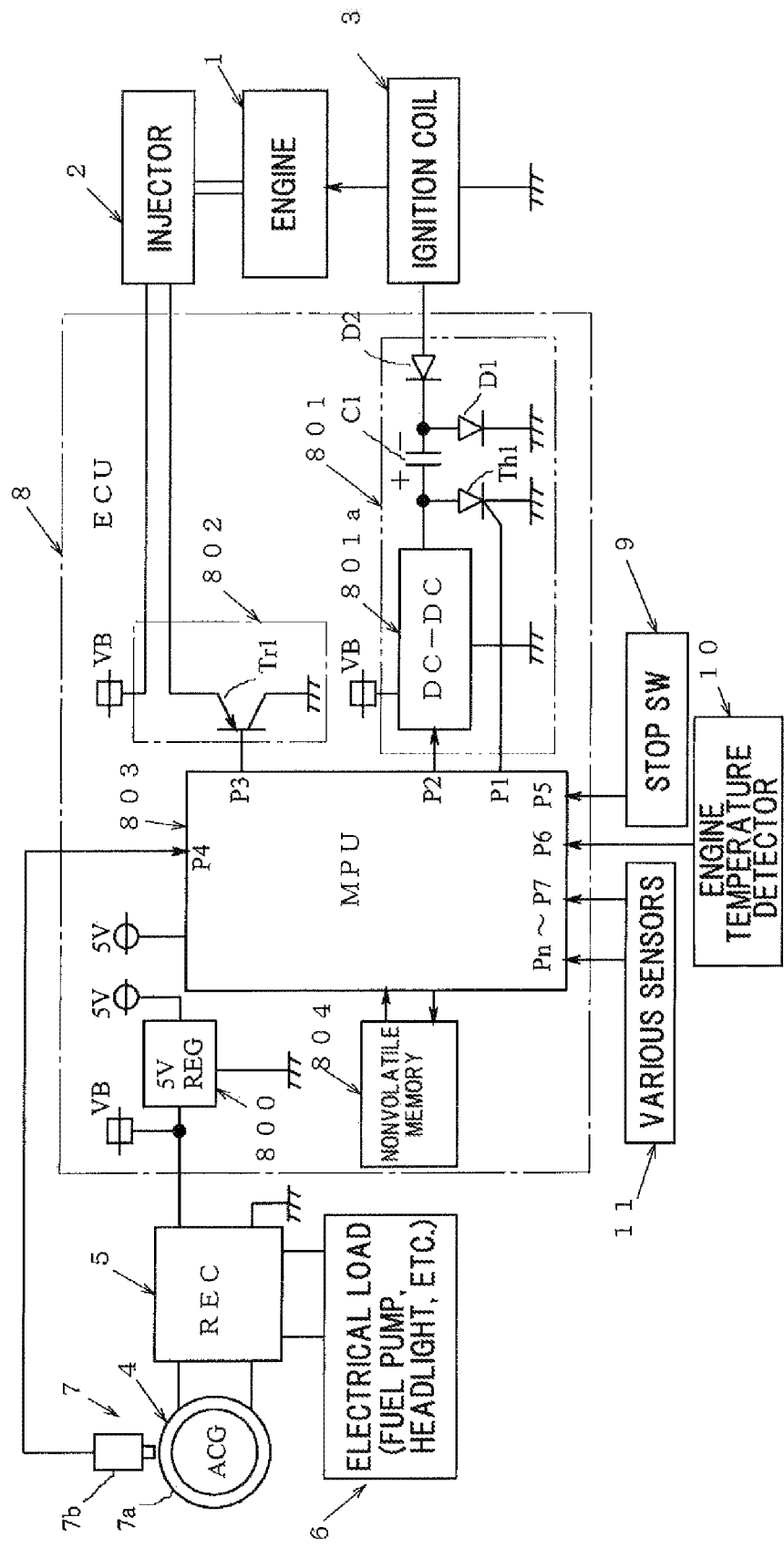
FIG. 1 is a block diagram schematically showing an example of a hardware configuration of a system provided with an engine to which the fuel injection control device according to the present invention is applied.

FIG. 1 schematically shows an example of a hardware configuration of a system to which the fuel injection control device according to the present invention is applied. In FIG. 1, reference 1 indicates a four-cycle engine, reference 2 indicates an injector for injecting fuel into an air intake passage in a throttle body of the engine 1, and reference 3 indicates an ignition coil for applying a high voltage for ignition to an ignition plug attached to a cylinder of the engine 1. The ignition coil 3 is a publicly known element having a primary coil and a secondary coil, and is configured so that one end of the primary coil and one end of the secondary coil are grounded, and a non-grounded terminal of the secondary coil is connected to a non-grounded terminal of the ignition plug.

The engine 1 to which the fuel injection control device according to the present invention is applied may be an engine that drives a conveyance such as a vehicle or an outboard motor, and may be a general-purpose engine, for example, an engine generator for generating AC voltage at commercial frequencies. In the present embodiment, the engine 1 is assumed to be an engine for driving a conveyance.

In FIG. 1, reference 4 indicates a flywheel magnet generator that is driven by the engine 1 and generates AC voltage. The generator 4 is a publicly known element provided with: a magnet rotor in which a permanent magnet is attached to an inner periphery of a cup-shaped iron flywheel attached to a crank shaft of the engine 1, the magnet rotor constituting a multipolar magnet field; and a stator in which a power-generating coil is wound about an armature core having magnetic pole parts opposed to the magnetic poles of the magnet rotor. The generator 4 outputs AC voltage in synchronization with rotation of the engine 1. The output of the generator 4 is inputted to a rectifier circuit 5 provided with a voltage control function for controlling the output voltage to or below a fixed value. An output voltage of the rectifier circuit 5 is supplied to electrical loads 6, such as an ECU, a fuel pump for supplying fuel to the injector 2, and headlights attached to the conveyance.

The injector 2 is a publicly known element provided with: an injector body that has a fuel injection opening in one end, and has a fuel introduction opening in a rear-end part; a valve that opens and closes the fuel injection opening; and a solenoid that manipulates the valve. The fuel is supplied into the injector body from the fuel pump. The injector 2 opens the valve while a drive pulse is supplied to a coil of the solenoid, and injects fuel into the air intake passage of the engine. As a pressure of the fuel sent into the injector 2 is kept fixed, an amount of fuel injected from the injector 2 is determined according to a period of time (fuel injection time) during which the valve of the injector is open. A dead time occurs from when the drive pulse is imparted to the injector 2 until injection of fuel actually starts. Therefore, a pulse width of the drive pulse imparted to the injector is set to a time obtained by adding the dead time to a prescribed fuel injection time.

In FIG. 1, reference 7 indicates a pulse generator for generating a pulse each time the crank shaft of the engine 1 rotates by a fixed angle, and reference 8 indicates an electronic control unit (ECU) configured from a part of an ignition device for igniting the engine 1, a part of a fuel injection device that supplies fuel to the engine 1, and a control unit for controlling the ignition device and the fuel injection device.

The ECU 8 shown in FIG. 1 is provided with a constant-voltage power supply circuit (voltage regulator) 800 for converting a DC voltage VB outputted by the rectifier circuit 5 to a fixed voltage (5V in the present embodiment), an ignition circuit 801 that constitutes the ignition device for igniting the engine 1 together with ignition coil 3, an injector drive circuit 802 for supplying drive pulses to the solenoid coil of the injector 2, and a microprocessor 803 that constitutes an essential part of a control device for controlling an ignition timing of the engine 1 as well as a fuel injection timing and a fuel injection amount. Reference 804 indicates a nonvolatile memory such as an EEPROM belonging to the microprocessor 803. The microprocessor 803 activates when a power supply voltage (5V) is supplied thereto from the constant-voltage power supply circuit 800.

The pulse generator 7 used in the present embodiment is a publicly known element provided with: a rotor 7a provided with one or more protrusions (not shown) formed on the outer periphery of a cup-shaped flywheel that constitutes a rotor yoke of the magnet generator 4, the rotor 7a rotating together with the crank shaft of the engine; and a signal generator 7b for detecting the protrusions of the rotor 7a and generating a pulse. The signal generator 7b is provided with, for example, an iron core having magnetic pole parts facing the protrusions on the outer periphery of the rotor 7a, a signal coil wound around the iron core, and a permanent magnet magnetically coupled to the iron core. The signal generator 7b outputs, from the signal coil, a pulse signal of which the polarity changes when rotational-direction front-end edges and rear-end edges of the protrusions of the rotor 7a are detected. A pulse of one polarity outputted by the pulse generator 7 is inputted to a port P4 of the microprocessor 803.

The pulse generator 7 may be constituted so as to generate a pulse each time the crank shaft rotates by a fixed angle. The configuration of the pulse generator 7 is not limited to the configuration described above.

In the present invention, the configuration of the ignition circuit 801 is not particularly limited. The ignition circuit 801 used in the present embodiment is formed from a publicly known capacitor discharge type circuit, and the ignition device for igniting the engine is configured from the ignition circuit 801 and the ignition coil 3. The ignition circuit 801 shown in FIG. 1 is provided with: a DC-DC converter (booster circuit) 801*a* that is controlled by a control signal outputted from a port P2 of the microprocessor 803, the DC-DC converter 801*a* boosting the DC voltage VB outputted by the rectifier circuit 5; an ignition capacitor C1 of which one end is connected to a positive-side output terminal of the DC-DC converter 801*a*; a diode D1 which is connected between another end of the ignition capacitor C1 and a ground terminal (negative-side output terminal of the booster circuit) with its cathode directed to the ground terminal; a thyristor Th1 which is connected between the one end of the ignition capacitor C1 and the ground terminal with its cathode directed to the ground terminal; and a diode D2 which is connected between the other end of the ignition capacitor C1 and a non-grounded terminal of the primary coil in a state which a cathode thereof is directed to the ignition capacitor. A gate of the thyristor Th1 is connected to a port P1 of the microprocessor 803. A trigger signal is supplied from the port P1 to the gate of the thyristor Th1 at the ignition timing of the engine 1.

In the ignition device shown in FIG. 1, the DC-DC converter 801*a* executes boosting through a switching operation until a voltage across both ends of the ignition capacitor C1 reaches to two hundred and several tens of volts. The microprocessor 803 supplies the trigger signal to the thyristor Th1 at the ignition timing of the engine. This turns the thyristor Th1 ON, and therefore an electric charge that has accumulated in the ignition capacitor C1 is discharged along a pathway from the capacitor C1 through the thyristor Th1, the primary coil of the ignition coil 3, and the diode D2 to the capacitor C1. This discharge induces a high voltage in the primary coil of the ignition coil 3, and this voltage is furthermore boosted and induces a high voltage for ignition in the secondary coil of the ignition coil 3. The high voltage is applied to the ignition plug (not shown) attached to the cylinder of the engine, and therefore spark discharge occurs in the ignition plug and the engine is ignited.

The injector drive circuit 802 shown in FIG. 1 is formed from a PNP transistor Tr1 with a collector thereof grounded. A base of the transistor Tr1 is connected to a port P3 of the microprocessor 803, and an emitter thereof is connected to one end of the coil of the solenoid that drives the valve of the injector 2. When a prescribed fuel injection timing is detected, the microprocessor 803 drops a potential of the port P3 to a ground potential during a period of time Tp (=Tinj+Td), which is obtained by adding a dead time Td to a fuel injection time Tinj, whereby the transistor Tr1 is turned ON. A drive pulse having a pulse width Tp is thereby supplied to the injector 2, and therefore the valve of the injector 2 is opened during the fuel injection time Tinj and fuel is injected into the air intake passage of the engine. The fuel injection time Tinj is controlled to thereby control the fuel injection amount.

In order to provide, to the microprocessor 803, the information indicating that a driver has performed a manipulation to stop the engine, a stop switch (kill switch) 9 is connected to a port P5 of the microprocessor 803. The stop switch 9 is a switch that is turned ON when the engine is stopped. While this switch is turned ON, a potential of the port P5 is lowered to ground potential. The microprocessor 803 recognizes that an engine stop command has been fed by the driver upon recognizing the reduction in the potential of the port P5, and acquires the information indicating that the driver intentionally stopped the engine.

An output of an engine temperature detector 10 for detecting a temperature of the engine is inputted to a port P6 of the microprocessor 803 through an A/D converter. The engine temperature detector 10 can be configured from, for example, a temperature sensor for detecting a temperature of cooling water in the engine, or a temperature sensor for detecting a temperature of a suitable location in an engine body, such as a cylinder or a crank case of the engine. In order to provide, to the microprocessor 803, other necessary information for controlling the engine 1, outputs of various sensors 11 are imparted to ports P7-Pn of the microprocessor 803 as necessary. In the present embodiment, a throttle position detector for detecting a position of a throttle valve of the engine is included among the various sensors 11. Depending on the circumstances, a pressure sensor for detecting a pressure in an air intake pipe of the engine may also be included among the various sensors 11.

Figure 2:
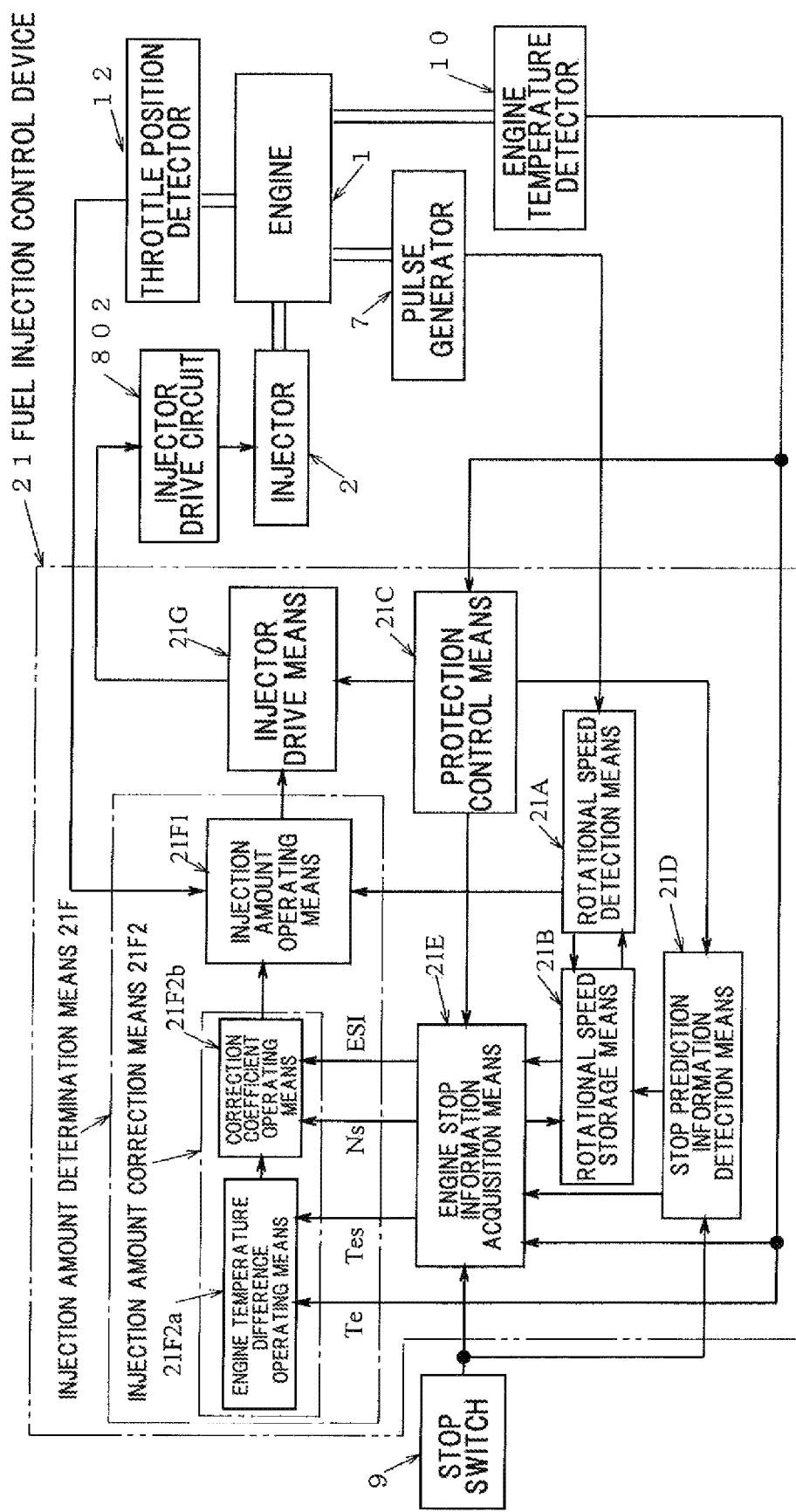
FIG. 2 is a block diagram showing a configuration of one embodiment of the fuel injection control device applied to the system shown in FIG. 1.

A configuration of an embodiment of a fuel injection control device 21 applied to the engine system shown in FIG. 1 is described with reference to FIG. 2. In FIG. 2, portions that are identical to portions shown in FIG. 1 are associated with references that are identical to those shown in FIG. 1.

The fuel injection control device 21 shown in FIG. 2 is provided with a rotational speed detection means 21A, a rotational speed storage means 21B, a protection control means 21C, a stop prediction information detection means 21D, an engine stop information acquisition means 21E, an injection amount determination means 21F, and an injector drive means 21G. The fuel injection control device 21 to which the present invention is applied is configured so that, when the engine 1 is intentionally stopped, fuel cutting for stopping injection of fuel from the injector 2 is performed. Configurations of the means provided in the fuel injection control device 21, reasons for providing these means, etc., are described in detail below.

<Rotational Speed Detection Means>

The rotational speed detection means 21A is a means which detects and temporarily holds a rotational speed of the engine each time the engine 1 rotates by a fixed angle. The rotational speed detection means 21A used in the present embodiment is configured so as to detect the rotational speed of the engine from a pulse generation interval each time the signal generator 7 generates a pulse, and store the detected rotational speed in a RAM provided in the rotational speed storage means 21B. The rotational speed detection means 21A shown in FIG. 2 executes an interrupt process each time a pulse is inputted from the pulse generator 7 to the port P4 of the microprocessor 803, reads a measurement value of a timer provided in the microprocessor, and subtracts a measurement value of the timer that was read during the last interrupt process from the measurement value of the timer that is read this time, thereby measuring the pulse generation interval of pulses generated by the pulse generator 7, and operates the rotational speed of the engine 1 from the pulse generation interval.

<Rotational Speed Storage Means>

The rotational speed storage means 21B stores the rotational speed detected by the rotational speed detection means 21A in an instantaneous speed storage address of the RAM, and holds the stored rotational speed at least until a time of a subsequent interrupt process. The rotational speed storage means 21B also stores the engine rotational speed detected by the rotational speed detection means 21A as a rotational speed on generation of the stop prediction information when the stop prediction information is detected by the stop prediction information detection means 21D (described below), and retains this rotational speed until a supply of power to the microprocessor is lost.

<Protection Control Means>

The protection control means 21C performs a control (protection control) in which, when it is necessary to stop the engine 1 in order to protect a specific object to be protected, fuel cutting is performed and the engine is intentionally stopped. The object to be protected may be the engine 1 itself, or may be an element other than the engine 1, such as a load driven by the engine 1. The protection control means 21C shown in FIG. 2 is configured so as to prohibit the injector drive means 21G from turning the transistor Tr1 of the injector drive circuit 802 ON when overheating is detected by the engine temperature detector 10, thereby performing the control in which fuel cutting is performed and the engine 1 is stopped.

<Stop Prediction Information Detection Means>

The stop prediction information detection means 21D detects, as stop prediction information, information obtained only in cases where a state of the engine stop is the intended stop. When stop prediction information is detected during driving of the engine, the stop prediction information detection means 21D judges whether or not the engine is intentionally to be stopped, and stores a result of judgement in the RAM. In addition, when the stop prediction information is detected, the rotational speed detected by the rotational speed detection means 21A is stored in the rotational speed storage means 21B as a rotational speed on generation of the stop prediction information.

The stop prediction information detection means 21D used in the present embodiment is configured so as to use, as the stop prediction information, either of an information indicating that an engine stop command has been generated due to the stop switch 9 having been manipulated and an information indicating that an engine stop control to be executed when an engine stop command is generated has been activated, along with an information indicating that the protection control executed by the protection control means 21C has been activated.

The engine stop control executed when the engine stop command is generated is a control which includes a series of processes for prohibiting performance of a process for supplying drive pulses to the injector in order to cause fuel to be injected from the injector 2, and stopping injection of fuel from the injector.

In the example shown in FIG. 1, the engine stop command is given to the microprocessor 803 when the stop switch 9 has been manipulated; however, the switch for giving the engine stop command to the microprocessor may be a key switch manipulated during start-up and the engine stop. The engine stop command may be given by a remote manipulation such as manipulation of a remote controller when the engine is stopped.

In the present embodiment, fuel cutting is necessarily performed when the engine is intentionally stopped. Therefore, the stop prediction information detection means 21D can be configured so as to use, as the stop prediction information, information indicating that a process for performing fuel cutting has started.

When the stop prediction information detection means 21D is provided as described in the present embodiment, the stop prediction information detection means 21D detecting, as stop prediction information, information generated only in cases where the state of the engine stop is the intended stop accompanied by fuel cutting, it is possible to ascertain that the engine has been intentionally stopped when it is confirmed that the stop prediction information has been detected by the stop prediction information detection means 21D during driving of the engine. Also, it is possible to ascertain whether the current engine stop is the intended stop or not, after the engine has stopped, by confirming content of the RAM, in which the result of judgement performed when the stop prediction information detection means 21D detected the stop prediction information is stored.

<Engine Stop Information Acquisition Means>

In order to precisely determine the start-up fuel injection amount when restarting the engine 1 after the engine 1 has been stopped, the engine stop information acquisition means 21E: acquires "engine stop information" that includes, at least "engine stopping state information" indicating whether the state of the current engine stop is the intended stop accompanied by fuel cutting, or whether this stopping state is the unintended stop not accompanied by fuel cutting; and stores the "engine stop information" in the nonvolatile memory 804.

In the present invention, it is fundamental to configure the engine stop information acquisition means 21E so as to: acquire, when the engine is stopped, the engine stop information including engine stopping state information indicating whether the state of the current engine stop is the intended stop accompanied by fuel cutting, or whether this stopping state is the unintended stop not accompanied by fuel cutting; and hold this information until the engine is restarted. In the present embodiment, in order to more precisely determine the fuel injection amount during start-up operation in accordance with the amount of fuel remaining in the air intake passage when the engine is restarted, the engine stop information acquired by the engine stop information acquisition means 21E includes an information about a "engine temperature at engine stop," which is the temperature of the engine at the time when the engine is stopped, and remaining fuel amount correlation data that is correlated with the amount of fuel remaining in the air intake passage of the engine. In the present embodiment, the engine rotational speed detected in a process where the engine is transferred from an operation state to a stop state is used as a stopping engine rotational speed, and the stopping engine rotational speed is used as the remaining fuel amount correlation data.

In the present embodiment, the stopping engine rotational speed information which is acquired as the remaining fuel amount correlation data in a process in which the engine is transferred from an operation state to a stop state, is made to be different depending on whether the engine stop was the intended stop or the engine stop was not the intended stop.

In cases where the engine stop is the intended stop, the rotational speed on generation of the stop prediction information is used as the stopping engine rotational speed, the rotational speed being stored in the rotational speed storage means 21B when the stop prediction information detection means 21D detected the stop prediction information. By contrast, in cases where the engine stop was not the intended stop, the engine rotational speed detected by the rotational speed detection means 21D immediately before the engine stop is used as the stopping engine rotational speed.

In cases where the engine stop is not the intended stop, generally the rotational speed of the engine is rapidly decreased to zero from a comparatively high level. The rotational speed immediately before the engine stop, which is detected when the engine stop is not the intended stop, is preferably a high rotational speed detected immediately before or immediately after a timing at which the process in which the engine is transferred from an operation state to an stop state is started, rather than being a low rotational speed which is detected at immediately before the engine stop. In order to reliably detect the rotational speed detected before and after the timing at which a process in which the engine is transferred from an operation state to a stop state is started, it is preferable to set an angle interval at which the pulse generator generates pulses so that the angle interval at which the rotational speed detection means detects the rotational speed is appropriately lengthened, within a range that resolution of the detection of the rotational speed is not excessively reduced.

Furthermore, when the protection control means 21C is provided as described in the present embodiment, the protection control means 21C executing fuel cutting to stop the engine in order to protect the engine or a load of the engine, the rotational speed on generation of the stop prediction information can also be used as the stopping engine rotational speed information acquired in cases where the engine stop was the intended stop, this rotational speed having been stored in the rotational speed storage means 21B at the timing when the protection control was activated.

In cases where an information indicating that a process for performing fuel cutting has started is used as the stop prediction information, the rotational speed on generation of the stop prediction information is used as the stopping engine rotational speed acquired when the engine stop is the intended stop, and stored in the rotational speed storage means 21B when the information indicating that a process for performing fuel cutting has been started was detected.

When it has been confirmed that the engine 1 has stopped, the engine stop information acquisition means 21E used in the present embodiment confirms whether the stop prediction information detection means 21D has detected the occurrence of the stop prediction information (information indicating that the engine stop command has occurred or that the protection control has been activated). When it is confirmed, according to the result of this confirmation, that the stop prediction information detection means 21D has detected the stop prediction information, the engine stop information acquisition means 21E used in the present embodiment: stores the information indicating that the current engine stop is the intended stop in the nonvolatile memory 804 as the engine stopping state information; and stores an engine temperature at engine stop and stopping engine rotational speed information in the nonvolatile memory 804 as engine stop information, where the engine temperature at engine stop is the engine temperature detected by the engine temperature detector 10, and the stopping engine rotational speed information is the rotational speed on generation of stop prediction information stored in the speed storage means 21B.

In addition, when it has been confirmed that the engine 1 has stopped, but it cannot be confirmed that the stop prediction information detection means 21D has detected the stop prediction information as a result of the process for confirming whether the stop prediction information detection means 21D has detected the stop prediction information during driving of the engine, the engine stop information acquisition means 21E used in the present embodiment: stores the information indicating that the current engine stop was not the intended stop in the nonvolatile memory 804 as the engine stopping state information; and stores an engine temperature at engine stop and stopping engine rotational speed information in the nonvolatile memory 804 as engine stop information, where the engine temperature at engine stop is the engine temperature detected by the engine temperature detector 10, and the stopping engine rotational speed is the engine rotational speed detected by the rotational speed detection means 21A immediately before the engine stopped.

As described above, the engine stop information acquisition means 21E used in the present embodiment reads the engine temperature detected by the engine temperature detector 10 as the engine temperature at engine stop and stores information about the engine temperature at engine stop in the nonvolatile memory 804 as the engine stop information when it is confirmed that the engine has stopped, both in cases where the engine stop was the intended stop and in cases where the engine stop was not the intended stop. In the present embodiment, the temperature of cooling water in the engine is used as the engine temperature at engine stop, but a temperature of a suitable location in the engine body, such as the cylinder or the crank case, may instead be used as the engine temperature.

Storage of the engine stopping state information indicating whether the engine stop was the intended stop or not can be performed by, e.g., configuring a program that controls the engine so as to set a flag when it is confirmed that the stop prediction information detection means 21D has detected the stop prediction information, and storing a state of the flag in the nonvolatile memory 804.

A process for storing the engine stop information in the nonvolatile memory 804 must be performed while the microprocessor 803 is operating. In cases where a battery is provided to the system in which the engine 1 is mounted and the microprocessor is operated even after the engine 1 has stopped, it is possible to perform the process for storing the engine stop information in the nonvolatile memory after the engine has stopped. However, in cases where no battery is provided to the system in which the engine is mounted and the system is configured so that the microprocessor is operated using the output of a generator driven by the engine, the process for storing the engine stop information in the nonvolatile memory must be performed without delay while power for driving the microprocessor remains due to energy stored in a capacitor provided in the constant-voltage power supply circuit 800.

<Injection Amount Determination Means>

The injection amount determination means 21F is a means for determining an amount of fuel to be injected from the injector 2 (fuel injection amount) during start-up of the engine and during steady state operation of the engine. The injection amount determination means 21F is configured so as to: derive an air intake amount of the engine according to suitable means; and determine the amount of fuel (fuel injection amount) that must be injected from the injector 2 in order to keep an air-fuel ratio of mixed air supplied into a combustion chamber of the engine within a stipulated range, the amount of fuel being determined with respect to the derived air intake amount. Because some of the injected fuel adheres to the inner surface of the air intake passage when the engine is started up, the fuel injection amount during start-up operation must be increased as compared to the fuel injection amount during steady operation of the engine.

Normally when the engine is started up, not only a start-up fuel injection amount increasing control is performed, but also a post-start-up fuel injection amount increasing control is performed for a fixed period after complete explosion of the engine is performed. The start-up fuel injection amount increasing control is a control for increasing an injection amount for the first time fuel injection performed at start-up of the engine so that the injection amount for the first time fuel injection is larger than an injection amount for injection performed at steady-operating state of the engine. The post-start-up fuel injection amount-increasing control is a control for increasing the fuel injection amount for the purpose of warm-up, etc. so that the injection amount is larger than an injection amount at a steady-operating state of the engine. In the present invention, the "engine start-up injection amount" determined with respect to an engine temperature difference and the stopping engine rotational speed is applied to the first time fuel injection, but this amount may also be applied to part or all of the fuel injection for which the post-start-up amount-increasing control is performed.

It is necessary to consider fuel remaining in the air intake passage on start-up when determining the fuel injection amount during start-up operation, and in cases where the amount of fuel remaining in the air intake passage is large, it is necessary to reduce the start-up fuel injection amount in accordance with the amount remaining. When the fuel injection amount is determined in consideration of fuel remaining in the air intake passage during start-up of the engine, the determination of the start-up fuel injection amount is already performed in consideration of a period of time elapsed from the last engine stop to the restart of the engine, and an engine temperature at engine stop. But, as described above, the amount of fuel remaining in the air intake passage when the engine is started up varies greatly depending on whether or not the last engine stop was the intended stop accompanied by fuel cutting, and therefore it is difficult to precisely determine the start-up fuel injection amount merely by considering the period of time elapsed from the last engine stop to the restart of the engine and the engine temperature at engine stop.

Thus, in the present embodiment, the injection amount determination means 21F is configured so as to perform, during start-up of the engine, an "engine stop judgement" for judging, from the engine stopping state information included in the engine stop information stored in the nonvolatile memory 804, whether the last engine stop was the intended stop or not, and so as to determine the fuel injection amount during start-up operation with reference to a result of the judgement.

In addition, in the present embodiment, the engine stop information includes not only the engine stopping state information but also the information about the engine temperature at engine stop, which is the engine temperature when the engine was stopped, and the information about the stopping engine rotational speed, which is the engine rotational speed detected in the process in which the engine transfers from operating state to stop state, and the injection amount determination means 21F is configured so as to determine the fuel injection amount during start-up operation in consideration of these pieces of information. The stopping engine rotational speed information is caused to be different depending on whether the engine stop was the intended stop or not, as described above.

The injection amount determination means 21F can take various forms, but in the example shown in FIG. 2, the injection amount determination means 21F is configured from injection amount operation means 21F1 and injection amount correction means 21F2. Configurations of these means are described below.

<Injection Amount Operation Means>

The injection amount operation means 21F1 shown in FIG. 2 operates an amount of fuel to be injected from the injector on the basis of the engine air intake amount estimated from the throttle valve position detected by the throttle position detector 12 and the engine rotational speed detected by the rotational speed detection means 21A. The injection amount operation means 21F1 operates the fuel injection amount on start-up of the engine so as to be larger than the injection amount during steady operation after start-up of the engine is complete, and operates a fuel injection amount that is necessary during steady operation of the engine in accordance with the throttle valve position after start-up of the engine is complete.

In the present embodiment, a configuration is adopted in which the engine air intake amount is estimated from the throttle valve position detected by the throttle position detector 12, but there are also cases where a pressure sensor for detecting the pressure in the air intake pipe of the engine is provided, and the engine air intake amount is estimated using the pressure in the air intake pipe as detected by the pressure sensor. There are also cases where the engine air intake amount is detected by an air flow meter.

When the engine is started up, the injection amount operating means 21F1 operates the fuel injection amount of an amount increased so as to be larger than the injection amount required during steady operation. When operating the fuel injection amount during start-up operation, the injection amount operating means 21F1 first operates, as a start-up basic injection amount, a start-up fuel injection amount required when in a state in which no fuel remains in the air intake passage of the engine, and then operates an actual injection amount at engine start-up by multiplying the start-up basic injection amount by a correction coefficient operated by the injection amount correction means 21F2.

<Injection Amount Correction Means>

The injection amount correction means 21F2 is means for operating a correction coefficient that is used in order to correct the start-up fuel injection amount operated by the injection amount operating means 21F1 so that the amount of fuel supplied to the engine is not excesses in cases where fuel remains in the air intake passage during start-up of the engine. In the present embodiment, the correction coefficient is defined as a proportion of the actual fuel injection amount at engine start-up relative to the start-up basic injection amount that is the fuel injection amount required when no fuel remains in the air intake passage of the engine when the engine is started up.

When it is judged on start-up operation of the engine that the last engine stop was the intended stop accompanied by fuel cutting on the basis of the engine stopping state information included in the engine stop information stored in the nonvolatile memory 804, the injection amount correction means 21F2 assumes that substantially no fuel remains in the air intake passage and operates the correction coefficient so as to match the actual fuel injection amount for start-up operation with the start-up basic injection amount operated by the injection amount operating means 21F1, or with an amount comparatively close to the start-up basic injection amount. By contrast, when it is judged on start-up of the engine that the last engine stop was the unintended stop not accompanied by fuel cutting on the basis of the engine stopping state information included in the engine stop information stored in the nonvolatile memory 804, the injection amount correction means 21F2 assesses that corresponding fuel remains in the air intake passage and operates the correction coefficient so that the actual fuel injection amount for start-up is less than the start-up basic injection amount operated by the injection amount operating means 21F1.

The amount of fuel remaining in the air intake passage when the engine is started up does not depend only on whether the last engine stop was accompanied by fuel cutting, but rather varies depending on the engine rotational speed immediately before the last engine stop, the engine throttle valve position immediately before the last engine stop, a negative pressure in the intake air pipe of the engine immediately before the last engine stop, a period of time elapsed between the last engine stop and restarting of the engine, etc.

In cases where the rotational speed the engine was low when fuel cutting started in order to intentionally stop the engine, scavenging in the air intake passage is not adequately performed before the engine stop, and therefore it is estimated that the amount of fuel remaining in the air intake passage after the engine stop is somewhat high. However, in cases where the rotational speed was somewhat high when fuel cutting started in order to intentionally stop the engine, scavenging in the air intake passage is performed numerous times before the engine stop, and therefore it is estimated that the amount of fuel remaining in the air intake passage after the engine has stopped is low. In cases where the engine is unintentionally stopped, it is estimated that a considerable quantity of fuel remains in the air intake passage after the engine has stopped. In such cases, the amount of fuel remaining in the air intake passage when the engine is stopped is larger as the magnitude of the rotational speed (stopping engine rotational speed) of the engine immediately before the engine stop is higher.

In addition, the amount of fuel remaining in the air intake passage in cases where the engine is unintentionally stopped is larger as a magnitude of the throttle valve position immediately before the engine stop is larger, and as a magnitude of an absolute value of the negative pressure in the air intake passage immediately before the engine stop is larger.

In cases where the period of time elapsed between the engine stop and restarting of the engine is long, it is assumed that the amount of fuel remaining in the air intake passage on start-up of the engine decreases due to the effect of volatilization, etc. However, in cases where the period of time elapsed between the engine stop and restarting of the engine is short, it is assumed that the amount of fuel remaining in the air intake passage on start-up of the engine is high.

In the present embodiment, a temperature difference derived by subtracting a start-up engine temperature that is the temperature of the engine at start-up of the engine from the engine temperature at engine stop ascertained from the engine stop information is designated as an "engine temperature difference." The period of time elapsed between the last engine stop and the restart of the engine is estimated from the engine temperature difference, and the amount of fuel remaining in the air intake passage when the engine is started up is more precisely estimated.

A low engine temperature difference means that the current start-up of the engine is restarting immediately after the engine stop. In such cases, it is anticipated that fuel remains in the air intake passage when the engine is started up, and particularly in cases where the last engine stop was the unintended stop not accompanied by fuel cutting, it is anticipated that large amount of the fuel remains.

A high engine temperature difference means that an extended period of time elapsed between the last engine stop and the current engine start-up. In such cases, it is estimated that the amount of fuel remaining in the air intake passage is low, even when the last engine stop was the unintended stop not accompanied by fuel cutting.

As described above, when the information about the engine temperature at engine stop is included in the engine stop information, it is possible to estimate, on the basis of the engine temperature difference that is the difference between the engine temperature at engine stop and the engine temperature at start-up, the amount of fuel remaining in the air intake passage on start-up of the engine in consideration of an effect of the period of time elapsed from the last engine stop to the current start-up of the engine, therefore making it possible to precisely determine the fuel injection amount on start-up of the engine.

For example, the correction coefficient operated by the injection amount correction means 21F2 is set so that the fuel injection amount on start-up of the engine is larger as a magnitude of the engine temperature difference is larger, both in cases where the last engine stop was the intended stop and in cases where the engine stop was not the intended stop, thereby making it possible to precisely determine the fuel injection amount on start-up of the engine.

The injection amount correction means 21F2 used in the example shown in FIG. 2 is configured from: engine temperature difference operating means 21F2$a$ for operating an engine temperature difference Tes−Te by performing an operation to subtract a start-up engine temperature Te detected on start-up of the engine from an engine temperature at engine stop Tes included in the engine stop information; and correction coefficient operating means 21F2$b$ for operating the correction coefficient with respect to the engine temperature difference and (/or) the stopping engine rotational speed included in the engine stop information, where the correction coefficient is a proportion (actual fuel injection amount at start-up of the engine/basic injection amount at start-up of the engine) of the actual fuel injection amount at start-up of the engine relative to the start-up basic injection amount that is the fuel injection amount required when no fuel remains in the air intake passage of the engine at start-up of the engine.

The correction coefficient operating means 21F2$b$ used in the present embodiment operates the correction coefficient with respect to the engine temperature difference so that the fuel injection amount at start-up of the engine is larger as the magnitude of the engine temperature difference is larger in cases where it has been judged at start-up of the engine that the last engine stop was the intended stop. The correction coefficient operating means 21F2$b$ used in the present embodiment moreover operates the correction coefficient with respect to both the engine temperature difference and the stopping engine rotational speed so that the fuel injection amount at start-up of the engine is larger as the magnitude of the engine temperature difference is larger and the fuel injection amount at start-up of the engine is smaller as the magnitude of the stopping engine rotational speed is larger in cases where it has been judged at start-up of the engine that the last engine stop was not the intended stop.

The correction coefficient operating means 21F2$b$ may be provided with a first correction coefficient operating map used when operating the correction coefficient in cases where the last engine stop was the intended stop, and a second correction coefficient operating map used when operating the correction coefficient in cases where the last engine stop was the unintended stop. The correction coefficient operating means 21F2b can be configured so as to operate the correction coefficient using the first correction coefficient operating map in cases where the last engine stop was the intended stop, and so as to operate the correction coefficient using the second correction coefficient operating map in cases where the last engine stop was the unintended stop.

In cases where the last engine stop was the intended stop, the engine is stopped due to fuel cutting and a plurality of scavenging are performed until the engine is stopped. The number of performance of scavenging is larger as the magnitude of the engine rotational speed at a time when fuel cutting has started is larger. Therefore, in cases where the intended stop is performed while the engine is rotating at a certain rotational speed, the amount of fuel remaining when the engine is stopped can be regarded as zero and the correction coefficient can be set to 1.00 irrespective of the engine temperature difference. In the same manner, in cases where the engine temperature difference is somewhat high, it can be considered that a period of time required for volatilizing remaining fuel is sufficiently secured even if a certain amount of fuel remains when the engine is stopped, and therefore the correction coefficient can be set to 1.00 irrespective of the stopping engine rotational speed.

By contrast, in cases where the engine temperature difference is low (cases where the period of time elapsed between stopping and restarting of the engine), it is considered that enough fuel remains on start-up of the engine to affect start-up of the engine. In such cases, the fuel injection amount at start-up of the engine is to be established in consideration of the period of time elapsed from engine stop to restart of the engine, and the correction coefficient is to be operated with respect to the engine temperature difference in which the period of time elapsed from the engine stop to the restart of the engine is reflected. The first correction coefficient operating map, which is used in such cases, is a two-dimensional map indicating a relationship between the engine temperature difference and the correction coefficient. FIG. 5 shows a table showing an example of a structure of the first correction coefficient operating map.

The map shown in FIG. 5 is created so that the correction coefficient for the fuel injection amount during start-up operation is larger as the magnitude of the engine temperature difference is larger. In cases where the correction coefficient is operated using this map, the injection amount determination means 21F determines the fuel injection amount during start-up operation with respect to the engine temperature difference so as to make the fuel injection amount during start-up operation closer to the basic injection amount at the start-up of the engine operated by the injection amount operating means 21F1, as the magnitude of the period of time elapsed from the engine stop to the restart of the engine is larger and as the engine temperature difference is larger.

In cases where the map shown in FIG. 5 is used, the injection amount correction means 21F2 sets the correction coefficient to 0.8 when the engine temperature difference is zero, and sets the correction coefficient to 1.00 when the engine temperature difference is 20° C. The injection amount operating means 21F1 uses 80% of the operated basic injection amount at the start-up of the engine as the fuel injection amount during start-up operation when the correction coefficient is 0.8, and uses the basic injection amount at the start-up of the engine operated by the injection amount operating means without modification as the fuel injection amount during start-up operation when the correction coefficient is 1.00.

In cases where the last engine stop was not the intended stop, most of the fuel remains at the engine stop because fuel cutting is not performed. The remaining amount of fuel when the engine is stopped differs wildly according to the engine rotational speed immediately before the engine stop. Therefore, in cases where the last engine stop was not the intended stop, the start-up fuel injection amount must be established in consideration of both the stopping engine rotational speed and the engine temperature difference in which the period of time elapsed from the last engine stop to the restart of the engine is reflected, and the correction coefficient must be established in consideration of both the engine temperature difference and the stopping engine rotational speed. The second correction coefficient operating map, which is used in such cases, is a three-dimensional map indicating a relationship between the engine temperature difference, the stopping engine rotational speed, and the correction coefficient. FIG. 6 shows a table showing an example of a structure of the second correction coefficient operating map.

The map shown in FIG. 6 is created so as to make the correction coefficient larger as the magnitude of the engine temperature difference is larger and make the correction coefficient smaller as the magnitude of the stopping engine rotational speed included in the engine stop information is larger. The map shown in FIG. 6 is also created so as to make the correction coefficient operated with respect to the engine temperature difference smaller than the correction coefficient operated with respect to the same engine temperature difference using the map shown in FIG. 5 in cases where the last engine stop was the intended stop.

In cases where the map shown in FIG. 6 is used, the correction coefficient is set to 0.5 when, for example, the engine temperature difference is 0° C. and the stopping engine rotational speed is 2000 r/min, and the fuel injection amount during start-up operation is set to 50% of the basic injection amount at the start-up of the engine operated by the injection amount operating means 21F1. The correction coefficient is set to 0.9 in cases where, for example, the engine temperature difference is 15° C. and the stopping engine rotational speed is 1000 r/min, and the fuel injection amount during start-up operation is set to 90% of the start-up basic injection amount operated by the injection amount operating means 21F1.

In the present embodiment, in cases where the last engine stop was the intended stop, the correction coefficient is operated only with respect to the engine temperature difference using the two-dimensional map giving the relationship between the engine temperature difference and the correction coefficient. However, in order to more accurately determine the fuel injection amount during start-up operation, it is possible to adopt a configuration so as to operate the correction coefficient with respect to both the engine temperature difference and the stopping engine rotational speed using the three-dimensional map giving the relationship between the engine temperature difference, the stopping engine rotational speed, and the correction coefficient even in cases where the engine stop was the intended stop. In such cases, the rotational speed on generation of the stop prediction information may be used as the stopping engine rotational speed. This rotational speed has been detected by the rotational speed detection means 21A and stored in the rotational speed storage means 21B at a timing immediately before fuel cutting started, for example, at a timing when generation of the stop prediction information has been confirmed (for example, at a timing when the stop switch 9 has been manipulated).

The maps used in order to operate the correction coefficient can be created by conducting experimentation to confirm start-up properties of the engine in cases where the start-up fuel injection amount is determined using a variety of values for a value of the correction coefficient, which is determined with respect to values of the engine temperature difference and the stopping engine rotational speed.

<Injector Drive Means>

The injector drive means 21G: operates a pulse width of a drive pulse required to be supplied from the injector drive circuit 802 to the injector 2 in order to cause fuel in the amount operated by the injection amount operating means 21F1 to be injected from the injector when continuous operation of the engine is permitted, the operation of the injection amount being performed each time a timing for injecting fuel from the injector 2 is detected; and drops the potential of the port P3 during a period of time that corresponds to the operated pulse width, thereby turning ON the transistor Tr1 of the injector drive circuit 802 and supplying the drive pulse to the injector 2.

<Processes Executed by Microprocessor>

Figure 3:
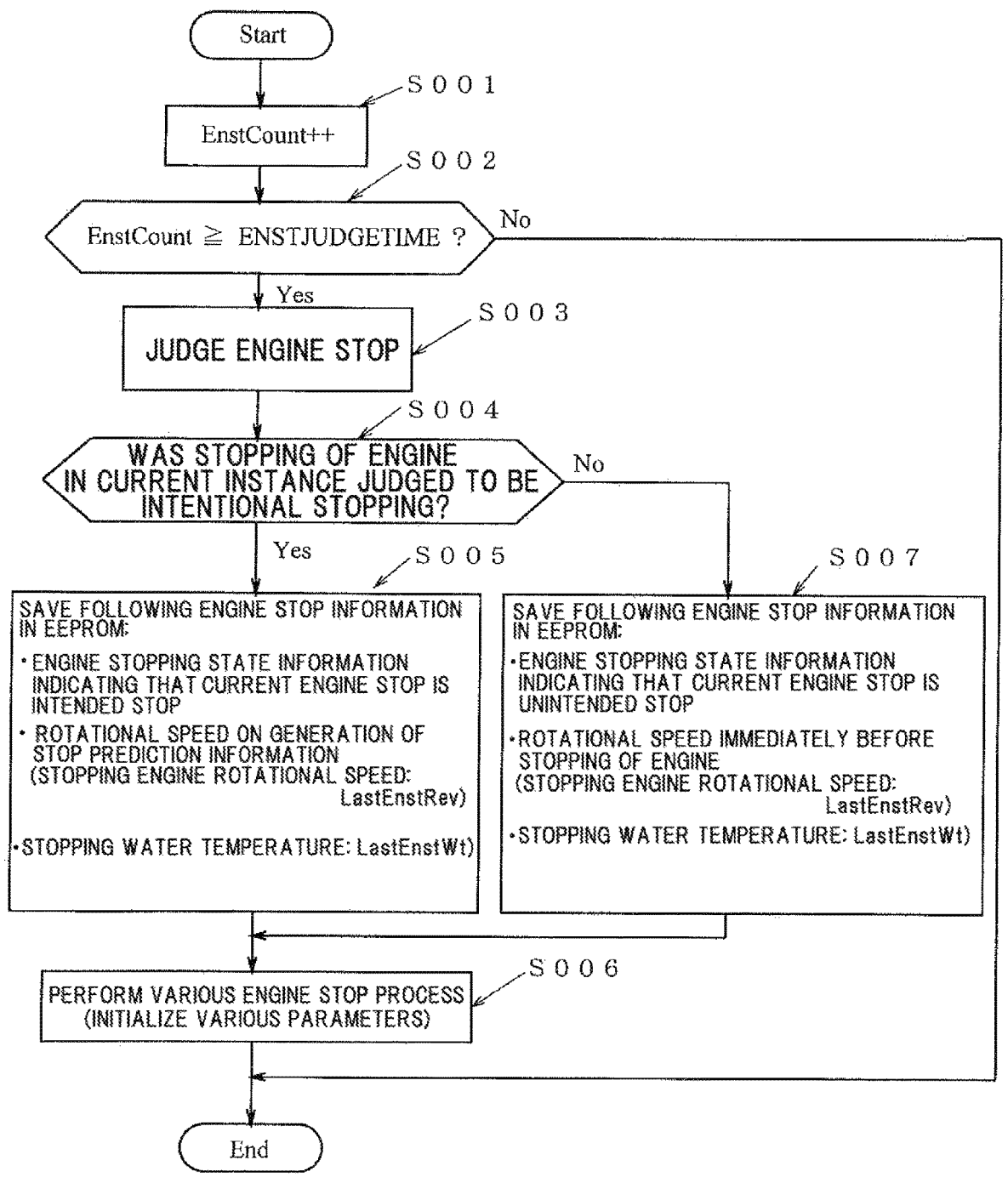
FIG. 3 is a flow chart showing an example of an algorithm of a task that is repeatedly executed by a microprocessor in order to acquire an engine stop information.
Figure 4:
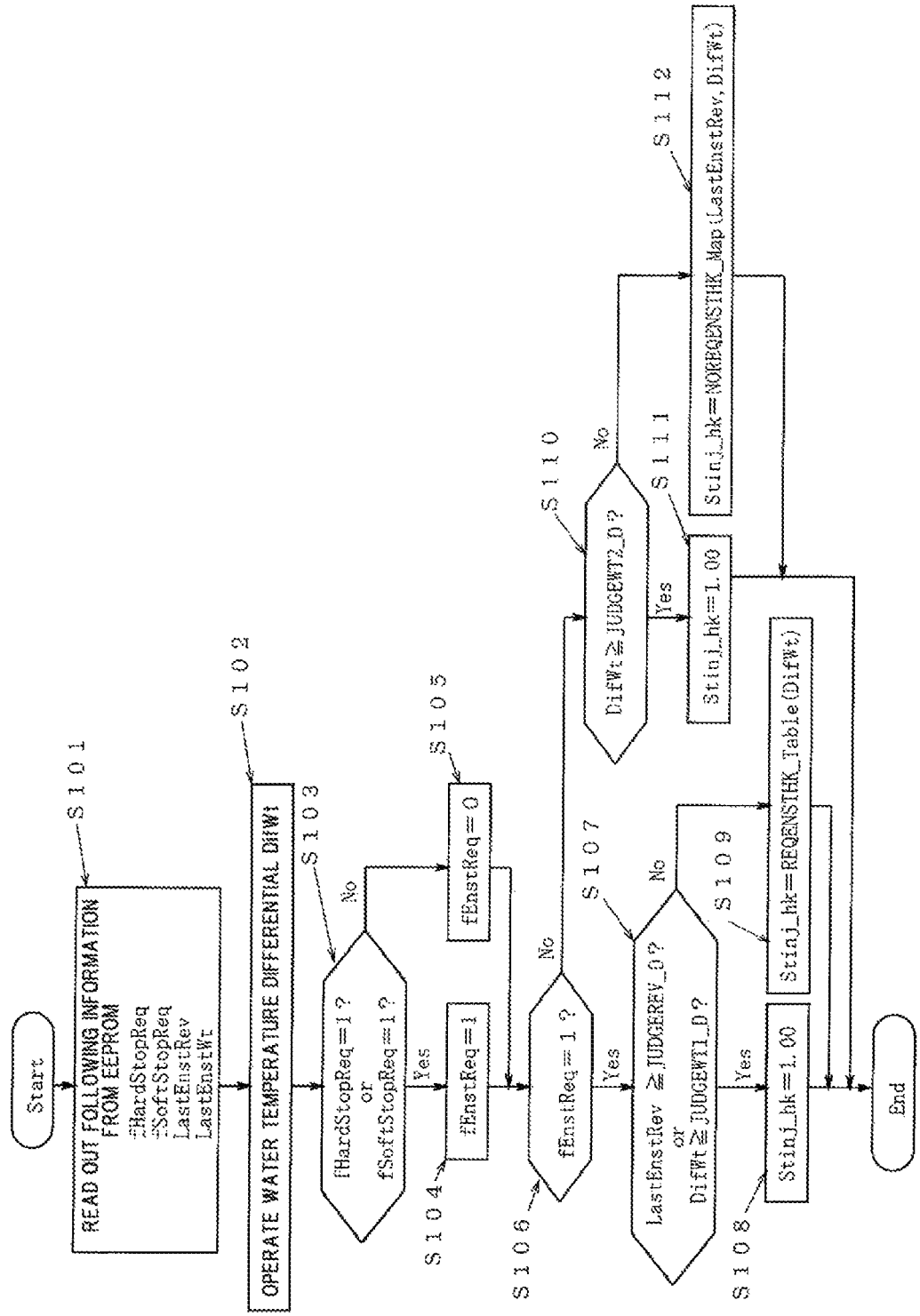
FIG. 4 is a flow chart showing an example of an algorithm of a process that is executed by the microprocessor when determining an fuel injection amount during start-up operation in the fuel injection control device shown in FIG. 2.

With reference to FIGS. 3 and 4, there are shown flow charts showing algorithms of processes that are executed by the microprocessor 803 in order to constitute the engine stop information acquisition unit 21E and the injection amount correction means 21F2 used in the present embodiment. The process shown in FIG. 3 is a task that is repeatedly executed at fixed time intervals during driving of the engine, and the process shown in FIG. 4 is a process that is executed when determining the correction coefficient for the injection amount at start-up of the engine. In the examples shown in FIGS. 3 and 4, the temperature of cooling water in the engine (water temperature) is used as the engine temperature. Therefore, in the description, below the engine temperature difference is sometimes referred to as a water temperature difference.

When the process shown in FIG. 3 is started, first an engine stall counter EnstCount is incremented in step S001, and then a judgement is made in step S002 as to whether a count value of EnstCount is equal to or greater than a judgement value ENSTJUDGETIME for judging the engine stop. The engine stall counter EnstCout is a counter provided in order to judge the engine stop. The engine stall counter EnstCout is cleared to zero each time a pulse is generated by the pulse generator 7, and is incremented each time the process in FIG. 3 is started. In cases where the engine does not stop, the pulse generator 7 generates a pulse before the count value of EnstCount becomes equal to or greater than the judgement value ENSTJUDGETIME, and EnstCount is cleared; therefore, the count value of EnstCount does not become equal to or greater than the judgement value ENSTJUDGETIME. By contrast, in cases where the engine is stopping, the interval at which pulses are generated by the pulse generator 7 lengthens, and therefore the count value of EnstCount becomes equal to or greater than the judgement value ENSTJUDGETIME for judging the engine stop. Therefore, it is judged in step S002 that the count value of EnstCount is equal to or greater than the judgement value ENSTJUDGETIME, thereby making it possible to judge whether the engine has stopped.

When it has been judged in step S002 that the count value of EnstCount is less than the judgement value ENSTJUDGETIME for judging the engine stop, it is judged that the engine has not stopped, and the task is terminated.

When it has been judged in step S002 that the count value of EnstCount is equal to or greater than the judgement value ENSTJUDGETIME for judging the engine stop, a judgement (engine stop judgement) is made in step S003 as to whether the engine has stopped, and then a judgement is made in step S004 as to whether the stop prediction information detection means 21D has judged that the current engine stop is the intended stop.

When it has been judged in step S004 that the current engine stop has been judged to be the intended stop, the task advances to step S005, the information indicating that the current engine stop is the intended stop is stored in the nonvolatile memory 804, and the information about the stopping engine rotational speed (LastEnstRev) is stored in the nonvolatile memory 804 as the engine stop information, where the stopping engine rotational speed is the rotational speed on generation of the stop prediction information, this rotational speed having been stored by the rotational speed storage means 21B. In addition, a temperature (LastEnstWt) of the cooling water in the engine as detected by the engine temperature detector 10 is stored in the nonvolatile memory 804 in step S005. The task then transitions to step S006, in which various processes required on the engine stop, such as initialization of various parameters, are performed, and then the task is terminated.

When it has been judged in step S004 that the stop prediction information detection means 21D has not judged that the current engine stop is the intended stop, the task advances to step S007, the information indicating that the current engine stop was not the intended stop is stored in the nonvolatile memory 804, and the information about the stopping engine rotational speed (LastEnstRev) is stored in the nonvolatile memory 804 as the engine stop information, where the stopping engine rotational speed is the engine rotational speed retained by the rotational speed detection means 21A immediately before the engine stopped. In addition, a temperature (LastEnstWt) of the cooling water in the engine as detected by the engine temperature detector 10 is stored in the nonvolatile memory 804 in step S007. The task then advances to step S006, in which various processes required on the engine stop are performed, and then the task is terminated.

An engine stop judgement means for judging whether the engine has stopped is configured from steps S001-S003 in the task shown in FIG. 3, and a stop state judgement means for judging whether the current engine stop was the intended stop or not is configured from step S004. The engine stop information acquisition means 21E is configured from steps S001-S007.

The process shown in FIG. 4 is performed when the engine is started up. Definitions of various flags and parameters used in the flow chart shown in FIG. 4 are as indicated in table 1 below.

TABLE 1

| | |
|---|---|
| fHardStopReq | Flag indicating whether the last engine stop was initiated by manipulation of stop switch |
| fSoftStopReq | Flag indicating whether the last engine stop was initiated by protection control |
| fEnstReq | Flag for judging stop state of the last engine stop |
| LastEnstRev | Stopping engine rotational speed |
| LastEnstWt | Water temperature at engine stop (engine temperature at engine stop) |
| Wt | Water temperature (start-up engine temperature) at time of start-up of engine |
| DifWt | Difference (engine temperature difference) between water temperature at the last engine stop and water temperature at present |

TABLE 1-continued

| | |
|---|---|
| StInj_hk | Start-up injection amount correction coefficient |
| JUDGEREV_D | Rotational speed threshold value 1 for judging appropriateness of execution of correcting start-up injection amount |
| JUDGEREV1_D | Water temperature threshold value 1 for judging appropriateness of execution of correcting start-up injection amount |
| JUDGEREV2_D | Water temperature threshold value 2 for judging appropriateness of execution of correcting start-up injection amount |
| REQENSTHK_Table | Start-up injection amount correction table used in cases where the last engine stop was the intended stop |
| NOREQENSTHK_Map | Start-up injection amount map used in cases where the last engine stop was the unintended stop |

In the process shown in FIG. 4, first the engine stop information is read out from the nonvolatile memory 804, and a variety of flags are set in step S101 in the sequence shown in (1)-(4) below.

(1) In cases where the information indicating that the last engine stop was the intended stop initiated by manipulation of the stop switch is saved in the nonvolatile memory, the flag fHardStopReq indicating whether the last engine stop was initiated by manipulation of the stop switch is set to 1; in all other cases (cases where the last engine stop was not initiated by manipulation of the stop switch by the driver), the flag fHardStopReq is set to 0.

(2) In cases where the information indicating that the last engine stop was initiated by various protection controls is stored in the nonvolatile memory, the flag fSoftStopReq indicating whether the last engine stop was initiated by the protection control is set to 1; in all other cases, the flag fSoftStopReq is set to 0.

(3) A value of the stopping engine rotational speed LastEnstReV that was detected at the last engine stop and stored in the nonvolatile memory is stored in the RAM.

(4) A water temperature (engine temperature) LastEnstWt that was detected in judgement of the last engine stop and stored in the nonvolatile memory is stored in the RAM.

A water temperature difference (engine temperature difference) DifWt (=LastEnstWt−Wt) is then operated in step S102 by subtracting the water temperature at a present point in time from the water temperature at the last engine stop. A judgement is then made in step S103 as to whether or not the last engine stop was the intended stop, the judgement being made on the basis of the flag fHardStopReq indicating whether or not the last engine stop was the intended stop initiated by manipulation of the stop switch 9, and the flag fSoftStopReq indicating whether the last engine stop was initiated by activation of the protection control. If either of these flags is set to 1, it is judged that the last engine stop was the intended stop and the flag fEnstReq is set to 1 in step S104; in all other cases, the flag fEnstReq is set to 0 in step S105.

After the process described above is performed, a judgement is made in step S106 as to whether the stop state judgement flag fEnstReq that indicates whether the state of the last engine stop was the intended stop is set to 1. In cases where the result of judgement is that the flag fEnstReq is set to 1 (cases where the last engine stop was the intended stop), the process advances to step S107, and judgements are made as to whether a first condition is fulfilled, where the first condition is that the stopping engine rotational speed Last-EnstRev at the last engine stop is equal to or greater than a threshold value JUDGEREV_D for judging an appropriateness of execution of correcting the start-up injection amount, and as to whether a second condition is fulfilled, where the second condition is that the temperature difference DifWt, which is derived by subtracting the water temperature (engine temperature) at the present point in time from the water temperature (engine temperature) on judgement of the last engine stop, is equal to or greater than a threshold value JUDGEWT1_D for judging the appropriateness of execution of correcting the start-up injection amount. In cases where it has been judged as a result that either of these conditions is fulfilled, it is judged that the amount of fuel remaining in the air intake passage can be ignored, the process advances to step S108, the correction coefficient Stinj_hk is set to 1.00, and the process is terminated. In cases where it has been judged in step S107 that neither of the conditions is fulfilled, the correction coefficient Stinj_hk is operated in step S109 with respect to the engine temperature difference according to a correction coefficient operating table REQENSTHK_Table(DifWt), and the process is terminated.

In cases where it has been judged in step S106 that the stop state judgement flag fEnstReq is not set to 1 (cases where the last engine stop was not the intended stop), the process advances to step S110, and a judgement is made as to whether a condition is fulfilled, where the condition is that the water temperature difference DiftWt is equal to or greater than a threshold value JUDGEWT2_D for judging the appropriateness of execution of correcting the start-up injection amount. In cases where it has been judged as a result that the condition is fulfilled, it is judged that the amount of fuel remaining in the air intake passage can be ignored, the process advances to step S111, the correction coefficient Stinj_hk is set to 1.00, and the process is terminated.

When it has been judged in step S110 that the first condition is not fulfilled, i.e., the water temperature difference DifWt is not equal to or greater than the threshold value JUDGEWT2_D for judging the appropriateness of execution of correcting the start-up injection amount, the process advances to step S112, the correction coefficient Stinj_hk is operated with respect to the engine temperature at engine stop and the stopping engine rotational speed according to a search of a correction coefficient operating table NOREQENSTHK_Map for (LastEnstRev, Difwt), and the process is terminated.

In cases involving the algorithm shown in FIG. 4, the engine temperature difference operating means 21F2*a* is configured from step S102 in FIG. 4, and the correction coefficient operating means 21F2*b* is configured from steps S109 and S112 in FIG. 4.

DESCRIPTION OF OPERATION OF PRESENT EMBODIMENT

In the fuel injection control device according to the present embodiment, while the engine is driven, a state in which the stop prediction information detection means 21D can detect the stop prediction information is maintained, and the circumstances of whether the engine is intentionally stopped is monitored. When the stop switch 9 is manipulated in order to stop the engine, the engine stop control activates to perform fuel cutting and stop the engine. When the stop switch 9 is manipulated, the stop prediction information detection means 21D detects that the stop prediction information was generated (that the engine stop control was activated). Therefore, it is judged that the engine was intentionally stopped, the engine stopping state information indicating that the last engine stop was the intended stop is stored in the RAM, and the rotational speed detected by the rotational speed detection means 21A when it was confirmed that the stop prediction information was generated is stored in the rotational speed storage means 21B as the rotational speed on generation of the stop prediction information.

When it is confirmed that the engine has been stopped by fuel cutting, the engine stop information acquisition means 21E: acquires engine stopping state information indicating that the current engine stop is the intended stop, in preparation for subsequent start-up of the engine; stores this information in the nonvolatile memory 804 as the engine stop information; acquires the rotational speed on generation of the stop prediction information as the stopping engine rotational speed, and acquires the engine temperature detected by the engine temperature detector 10 as the engine temperature at engine stop; and stores these pieces of information in the nonvolatile memory 804. Additionally, in cases where the engine is stopped due to activation of the protection control, the stop prediction information detection means 21D acquires an information similar to that described above and stores the information in the nonvolatile memory.

In cases where the engine stops unexpectedly due to insufficient torque, etc., the engine stop information acquisition means 21E: acquires the engine stopping state information indicating that the current engine stop is not the intended stop; stores this information in the nonvolatile memory 804 as the engine stop information; acquires the engine rotational speed detected immediately before the engine stopped as the stopping engine rotational speed, and acquires the engine temperature detected by the engine temperature detector 10 as the engine temperature at engine stop; and stores these pieces of information in the nonvolatile memory 804.

After the engine has stopped, when a manipulation to restart the engine is performed: the injection amount operating means 21F1 operates the start-up basic fuel injection amount for the engine with respect to the air intake amount estimated according to the throttle position; and the injection amount correction means 21F2 operates the correction coefficient on the basis of the engine stopping state information and the stopping engine rotational speed information acquired by the engine stop information acquisition means 21E at the last engine stop, and on the basis of the engine temperature difference operated by the engine temperature difference operating means 21F2a—. The injection amount operating means 21F1 performs a correction operating in which the start-up basic injection amount is multiplied by the correction coefficient, and operates the amount of fuel to be actually injected on start-up. In this instance, the injector drive means 21G gives the drive command to the injector drive circuit 802 for the purpose of imparting, to the injector 2, a drive pulse having the pulse width required in order to cause fuel in the amount operated by the injection amount operating means to be injected from the injector 2, and causes fuel in the operated amount to be injected from the injector 2.

In the fuel injection control device of the present embodiment, in the procedure in which the engine transitions from operating state to stop state, the engine stop information is acquired and stored in the nonvolatile memory, the engine stop information including the engine stopping state information indicating whether or not the state of the current engine stop is the intended stop accompanied by fuel cutting. In addition, during start-up of the engine, the fuel injection amount during start-up operation is determined using the information indicating whether or not the last engine stop was the intended stop, and the information about the stopping engine rotational speed and the engine temperature at engine stop acquired at the last engine stop. Therefore, it is possible to more precisely judge the fuel injection amount during start-up operation and improve the start-up properties of the engine.

In the embodiment described above, the injection amount determination means 21F is configured so as to operate the fuel injection amount during start-up operation by performing the correction operating in which the start-up basic injection amount is multiplied by the correction coefficient operated by the correction coefficient operating means 21F2b. However, it is also possible to configure the injection amount operating means so as to operate the fuel injection amount during start-up operation using the engine stopping state information at the last engine stop, the information about the stopping engine rotational speed, and the information about the engine temperature at engine stop and the start-up engine temperature, without using the correction coefficient.

In the embodiment described above, the fuel injection amount during start-up operation is operated on the basis of the information indicating that the last engine stop was the intended stop, information about the stopping engine rotational speed detected at the last engine stop, and the information about the engine temperature at engine stop. However, depending on the circumstances, the engine start-up fuel injection temperature may be operated on the basis of the information indicating whether the last engine stop was the intended stop and the engine temperature at engine stop, without using the information about the stopping engine rotational speed. In such cases, the engine stop information acquisition means is configured so that the information about the engine temperature at engine stop, which is the temperature when the engine is stopped, is stored in the nonvolatile memory as the engine stop information. In addition, the fuel injection amount during start-up operation is determined so that the fuel injection amount during start-up operation is larger as the magnitude of the engine temperature difference derived by subtracting the engine temperature on start-up of the engine from the engine temperature at engine stop is larger, both in cases where it has been judged that the last engine stop was the intended stop and in cases where it has been judged that the last engine stop was not the intended stop.

Depending on the circumstances, the fuel injection amount during start-up operation may be determined on the basis of the information indicating whether the last engine stop was the intended stop or not and the information about the stopping engine rotational speed detected at the last engine stop, without using the information about the engine temperature at the last engine stop.

In such cases, the engine stop information acquisition means is configured so that, when it is confirmed that the stop prediction information detection means detected stop prediction information, the information indicating that the last engine stop was the intended stop is stored in the nonvolatile memory as engine stopping state information, and the information about the stopping engine rotational speed is stored in the nonvolatile memory as the engine stop information, where the stopping engine rotational speed is the rotational speed on generation of the stop prediction information, this rotational speed having been stored by the rotational speed storage means. In addition, the engine stop information acquisition means is configured so that, when it cannot be confirmed that the stop prediction information detection means has detected the stop prediction information, the information indicating that the current engine stop was not the intended stop is stored in the nonvolatile memory as the engine stopping state information, and the information about the stopping engine rotational speed is stored in the nonvolatile memory as the engine stop information, where the stopping engine rotational speed is the engine rotational speed detected by the rotational speed detection means immediately before the engine stopped. Moreover, the injection amount determination means is configured so as to determine the fuel injection amount during start-up operation so that the fuel injection amount during start-up operation is larger as the magnitude of the stopping engine rotational speed is larger when it is judged from the engine stopping state information that the last engine stop was the intended stop, and the fuel injection amount during start-up operation is smaller as the magnitude of the stopping engine rotational speed is larger when it is judged from the engine stopping state information that the last engine stop was not the intended stop.

In cases where the present invention is configured as described above, the fuel injection amount during start-up operation may be derived by operating the correction coefficient on the basis of the information indicating whether the last engine stop was the intended stop and the information about the stopping engine rotational speed detected at the last engine stop, and multiplying the start-up basic injection amount by the correction coefficient. Alternatively, the fuel injection amount during start-up operation may be operated by preparing two maps without using the correction coefficient, the two maps including a map for operating the start-up fuel injection amount with respect to the stopping engine rotational speed in cases where the last engine stop was the intended stop, and a map for operating the start-up fuel injection amount with respect to the stopping engine rotational speed in cases where the last engine stop was the unintended stop.

In the embodiment described above, the fuel injection amount during start-up operation is derived by: operating the correction coefficient on the basis of the information indicating whether the last engine stop was the intended stop, the information about the stopping engine rotational speed detected at the last engine stop, and the engine temperature at engine stop detected at the last engine stop; and performing a correction operating in which the start-up basic injection amount is multiplied by the correction coefficient. However, even in cases where the fuel injection amount during start-up operation is determined on the basis of the information indicating whether the last engine stop was the intended stop, the information about the stopping engine rotational speed detected at the last engine stop, and the information about the engine temperature at engine stop detected at the last engine stop, the fuel injection amount during start-up operation can instead be determined without using the correction coefficient.

In such cases, the engine stop information acquisition means can be configured so that when it is confirmed that the stop prediction information detection means detected the stop prediction information before the engine stops, information indicating that the current engine stop is the intended stop is stored in the nonvolatile memory as the engine stopping state information, and the information about the stopping engine rotational speed is stored in the nonvolatile memory as the engine stop information, where the stopping engine rotational speed is the rotational speed on generation of the stop prediction information, this rotational speed having been stored by the rotational speed storage means, and moreover is configured so that when it cannot be confirmed that the stop prediction information detection means detected stop prediction information, the information indicating that the current engine stop is not the intended stop is stored in the nonvolatile memory as the engine stopping state information, and the information about the stopping engine rotational speed is stored in the nonvolatile memory as the engine stop information, where the stopping engine rotational speed is the engine rotational speed detected by the rotational speed detection means immediately before the engine stopped.

In addition, the engine stop information acquisition means is configured so that the information about the engine temperature at engine stop, which is the temperature when the engine is stopped, is also stored in the nonvolatile memory in addition to the engine stopping state information. Moreover, the injection amount determination means is configured so that when it has been judged from the engine stopping state information that the last engine stop was the intended stop, the fuel injection amount during start-up operation is determined with respect to the engine temperature difference so that the fuel injection amount during start-up operation is larger as the magnitude of the engine temperature difference derived by subtracting the engine temperature on start-up of the engine from the engine temperature at engine stop stored in the nonvolatile memory is larger, and moreover is configured so that when it has been judged from the engine stopping state information that the last engine stop was not the intended stop, the fuel injection amount during start-up operation is determined with respect to both the engine temperature at engine stop and the stopping engine rotational speed so that the fuel injection amount during start-up operation is smaller as the magnitude of the stopping engine rotational speed is larger and the fuel injection amount during start-up operation is larger as the magnitude of the engine temperature difference is larger.

In the embodiment described above, an engine rotational speed detected immediately before the engine stop is used as remaining fuel amount correlation data that is correlated with the amount of fuel remaining in the air intake passage of the engine in cases where the engine stop was not the intended stop. However, it is also possible to use a fuel injection amount in fuel injection performed immediately before the engine stop, an engine throttle valve position immediately before the engine stop, the negative pressure in the air intake pipe of the engine immediately before the engine stop, etc., as the remaining fuel amount correlation data used in order to determine the fuel injection amount during start-up operation in cases where the engine stop was not the intended stop.

Although a preferred embodiment of the present invention is described above, the present invention is not limited by the embodiment described above. Various modifications can be performed on the constituent elements of the present invention within a scope that does not deviate from the technical idea set forth in the claims.

EXPLANATION OF NUMERALS AND CHARACTERS

1 Engine
2 Injector
3 Ignition coil
4 Flywheel magnet generator
5 Rectifier circuit
6 Electrical load
7 Pulse generator
8 ECU 800 Constant-voltage power supply circuit
801 Ignition circuit
802 Injector drive circuit
803 Microprocessor
804 Nonvolatile memory (EEPROM)
9 Stop switch
10 Engine temperature detector
11 Various sensors
12 Throttle position detector
21 Fuel injection control device
21A Rotational speed detection means
21B Rotational speed storage means
21C Protection control means
21D Stop prediction information detection means
21E Engine stop information acquisition means
21F Injection amount determination means
21F1 Injection amount operation means
21F2 Injection amount correction means
21F2*a* Engine temperature difference operation means
21F2*b* Correction coefficient operation means
21G Injector drive means

The invention claimed is:

1. A fuel injection control device provided with an injection amount determination means for determining a fuel injection amount for an engine to which fuel is supplied by an injector, and an injector drive means for driving the injector so that fuel in an amount determined by the injection amount determination means is injected from the injector, the fuel injection control device being configured so that when the engine is intentionally stopped, fuel cutting for stopping the injection of fuel from the injector is performed, wherein
the fuel injection control device is provided with an engine stop information acquisition means that, in a process in which the engine is transferred from an operation state to a stop state, acquires an engine stop information that includes at least an engine stopping state information indicating whether or not a state of current engine stop is an intended stop accompanied by the fuel cutting, and stores the engine stop information in a nonvolatile memory, and
the injection amount determination means is configured so as to perform, when the engine is started up, a judgement whether the last engine stop was the intended stop or not, based upon the engine stopping state information stored in the nonvolatile memory, and then determine an fuel injection amount during start-up operation in which a result of the judgement is reflected.

2. The fuel injection control device according to claim 1, wherein the injection amount determination means is configured so as to:
judge based upon the engine stop information stored in the nonvolatile memory whether the last engine stop was the intended stop or not; and
determine the fuel injection amount during start-up operation such that the fuel injection amount during start-up operation determined when it has been judged that the last engine stop was not the intended stop is less than the fuel injection amount during start-up operation determined when it has been judged that the last engine stop was the intended stop.

3. The fuel injection control device according to claim 2, wherein:
the fuel injection control device is provided with a stop prediction information detection means that detects, as a stop prediction information, information generated only in cases where the engine stop is the intended stop; and
the engine stop information acquisition means is configured so that, when it is confirmed that the stop prediction information detection means has detected the stop prediction information before the engine stop, the engine stopping state information indicating that the current engine stop is the intended stop is stored in the nonvolatile memory as the engine stop information, and is configured so that when it cannot be confirmed that the stop prediction information detection means has detected the stop prediction information before the engine stop, the engine stopping state information indicating that the current engine stop is not the intended stop is stored in the nonvolatile memory as the engine stop information.

4. The fuel injection control device according to claim 3, wherein:
the fuel injection control device is provided with an engine temperature detector for detecting a temperature of the engine;
the engine stop information acquisition means is configured so that an information about engine temperature at engine stop, which is an engine temperature detected by the engine temperature detector when the engine is stopped, is also stored in the nonvolatile memory as the engine stop information; and
the injection amount determination means is configured so as to determine the fuel injection amount during start-up operation so that the fuel injection amount during start-up operation becomes larger, as a magnitude of an engine temperature difference derived by subtracting an engine temperature at start-up of the engine from the engine temperature at engine stop becomes larger, both in cases where it has been judged from the engine stopping state information stored in the nonvolatile memory that the last engine stop was the intended stop, and in cases where it has been judged from the aforementioned engine stopping state information that the last engine stop was not the intended stop.

5. The fuel injection control device according to claim 3, wherein:
the fuel injection control device is provided with an engine temperature detector for detecting temperature of the engine, and means for detecting remaining fuel amount correlation data that is correlated with an amount of fuel remaining in an air intake passage of the engine in cases where stop of the engine is not the intended stop;
the engine stop information acquisition means is configured so that in cases where it has been judged from the engine stopping state information that the current engine stop is the intended stop, information about engine temperature at engine stop, which is engine temperature detected by the engine temperature detector when the engine is stopped, is also stored in the nonvolatile memory as the engine stop information, and is configured so that in cases where it has been judged from the engine stopping state information that the current engine stop is not the intended stop, the information about the engine temperature at engine stop and the remaining fuel amount correlation data are also stored in the nonvolatile memory as the engine stop information; and the injection amount determination means is configured so as to determine the fuel injection amount during start-up operation with respect to an engine temperature difference derived by subtracting engine temperature at present from the engine temperature at engine stop, so that the fuel injection amount during start-up operation becomes larger as magnitude of the engine temperature difference becomes larger in cases where it has been judged from the engine stopping state information stored in the nonvolatile memory that the last engine stop was the intended stop, and is configured so as to determine the fuel injection amount during start-up operation so that the fuel injection amount during start-up operation becomes larger as magnitude of the engine temperature difference becomes larger and the fuel injection amount during start-up operation becomes smaller as the magnitude of the remaining amount of fuel estimated from the remaining fuel amount correlation data becomes larger in cases where it has been judged from the engine stop information stored in the nonvolatile memory that the last engine stop was not the intended stop.

6. The fuel injection control device according to claim 5, wherein the remaining fuel amount correlation data used in cases where it has been judged that the last engine stop was the unintended stop is an engine rotational speed immediately before the engine stop.

7. The fuel injection control device according to claim 5, wherein the remaining fuel amount correlation data used in cases where it has been judged that the last engine stop was the unintended stop is a fuel injection amount in a fuel injection performed immediately before the engine stop.

8. The fuel injection control device according to claim 5, wherein the remaining fuel amount correlation data used in cases where it has been judged that the last engine stop was the unintended stop is an engine throttle valve position of the engine at a timing immediately before the engine stop.

9. The fuel injection control device according to claim 5, wherein the remaining fuel amount correlation data used in cases where it has been judged that the last engine stop was the unintended stop is a negative pressure in an air intake pipe of the engine immediately before the engine stops.

10. The fuel injection control device according to claim 1, wherein:
the fuel injection control device is provided with
a stop prediction information detection means for detecting, as a stop prediction information, an information generated only in cases where the state of the engine stop is the intended stop,
a rotational speed detection means for detecting a rotational speed of the engine each time the engine rotates by a fixed angle, and
an engine temperature detector for detecting temperature of the engine;
the engine stop information acquisition means is configured so that when it is confirmed that the stop prediction information detection means has detected the stop prediction information immediately before the engine stop, an information indicating that the current engine stop is the intended stop is stored in the nonvolatile memory as the engine stop information, and an information about a stopping engine rotational speed and an engine temperature at engine stop are also stored in the nonvolatile memory as the engine stop information, where the stopping engine rotational speed is a rotational speed detected by the rotational speed detection means when the stop prediction information is detected by the stop prediction information detection means, and the engine temperature at engine stop is an engine temperature detected by the engine temperature detector when the engine is stopped, and is configured so that when it cannot be confirmed that the stop prediction information detection means has detected the stop prediction information immediately before the engine stop, information indicating that the current engine stop is not the intended stop is stored in the nonvolatile memory as the engine stop information, and an information about stopping engine rotational speed and engine temperature at engine stop are also stored in the nonvolatile memory as the engine stop information, where the stopping engine rotational speed is an engine rotational speed detected by the rotational speed detection means immediately before the engine stop and the engine temperature at engine stop is an engine temperature detected by the engine temperature detector when the engine is stopped; and
the injection amount determination means is configured so as to determine the fuel injection amount during start-up operation with respect to the stopping engine rotational speed and an engine temperature difference derived by subtracting engine temperature at start-up of the engine from the engine temperature at engine stop stored in the nonvolatile memory so that the fuel injection amount during start-up operation becomes larger as the magnitude of the engine temperature difference is larger and the fuel injection amount during start-up operation becomes larger as the stopping engine rotational speed is higher when it has been judged from the engine stopping state information stored in the nonvolatile memory that the last engine stop was the intended stop, and is configured so as to determine the fuel injection amount during start-up operation with respect to the engine temperature difference and the stopping engine rotational speed so that the fuel injection amount during start-up operation becomes larger as the magnitude of the engine temperature difference is larger and the fuel injection amount during start-up operation becomes smaller as the stopping engine rotational speed is higher when it has been judged from the engine stop information stored in the nonvolatile memory that the last engine stop was not the intended stop.

11. The fuel injection control device according to claim 1, wherein:
the fuel injection control device is provided with
a stop prediction information detection means for detecting, as stop prediction information, an information generated only in cases where the state of the engine stop is the intended stop, a rotational speed detection means for detecting a rotational speed of the engine each time the engine rotates by a fixed angle, and
an engine temperature detector for detecting a temperature of the engine;
the engine stop information acquisition means is configured so that when it is confirmed that the stop prediction information detection means has detected the stop prediction information before the engine stop, information indicating that the current engine stop is the intended stop is stored in the nonvolatile memory as the engine stop information, and an information about an engine temperature at engine stop is also stored in the nonvolatile memory as the engine stop information, where the engine temperature at engine stop is an engine temperature detected by the engine temperature detector when the engine is stopped, and is configured so that when it cannot be confirmed that the stop prediction information detection means has detected the stop prediction information before the engine stop, an information indicating that the current engine stop is not the intended stop is stored in the nonvolatile memory as the engine stop information, and an information about a stopping engine rotational speed and an engine temperature at engine stop is also stored in the nonvolatile memory as the engine stop information, where the stopping engine rotational speed is engine rotational speed detected by the rotational speed detection means immediately before the engine stop, and the engine temperature at engine stop is engine temperature detected by the engine temperature detector when the engine is stopped; and the injection amount determination means is configured so as to determine the fuel injection amount during start-up operation with respect to an engine temperature difference derived by subtracting engine temperature on start-up of the engine from the engine temperature at engine stop stored in the nonvolatile memory so that the fuel injection amount during start-up operation becomes larger as the magnitude of the engine temperature difference is larger when it has been judged from the engine stopping state information stored in the nonvolatile memory that the last engine stop was the intended stop, and is configured so as to determine the fuel injection amount during start-up operation with respect to both the engine temperature difference and the stopping engine rotational speed so that the fuel injection amount during start-up operation becomes larger as the magnitude of the engine temperature difference is larger and the fuel injection amount during start-up operation becomes smaller as the stopping engine rotational speed is higher when it has been judged from the engine stop state information stored in the nonvolatile memory that the last engine stop was not the intended stop.

12. The fuel injection control device according to claim 1, wherein:

the fuel injection control device is provided with a stop prediction information detection means for detecting, as a stop prediction information, an information generated only in cases where the state of the engine stop is the intended stop, a rotational speed detection means for detecting a rotational speed of the engine each time the engine rotates by a fixed angle, and an engine temperature detector for detecting a temperature of the engine;

the engine stop information acquisition means is configured so that when it is confirmed that the stop prediction information detection means has detected the stop prediction information before the engine stop, an information indicating that the current engine stop is the intended stop is stored in the nonvolatile memory as the engine stop information, and an information about an engine temperature at engine stop and an information about stopping engine rotational speed are also stored in the nonvolatile memory as the engine stop information, where the engine temperature at engine stop is an engine temperature detected by the engine temperature detector when the engine is stopped, and the stopping engine rotational speed is a rotational speed detected by the rotational speed detection means when the stop prediction information is detected by the stop prediction information detection means, and is configured so that when it cannot be confirmed that the stop prediction information detection means has detected the stop prediction information before the engine stop, an information indicating that the current engine stop is not the intended stop is stored in the nonvolatile memory as the engine stop information, and an information about an engine temperature at engine stop and a stopping engine rotational speed is also stored in the nonvolatile memory as the engine stop information, where the engine temperature at engine stop is a temperature detected by the engine temperature detector when the engine is stopped, and the stopping engine rotational speed is an engine rotational speed detected by the rotational speed detection means immediately before the engine stop;

the injection amount determination means is provided with an engine temperature difference operation means for operating an engine temperature difference by subtracting temperature on start-up of the engine from the engine temperature at engine stop stored in the nonvolatile memory, an injection amount operating means for operating a fuel injection amount during start-up operation and a fuel injection amount during steady operation, and a correction coefficient operation means for operating a correction coefficient with respect to the engine temperature difference and/or the stopping engine rotational speed, where the correction coefficient is a proportion of the actual fuel injection amount at engine start-up relative to a start-up basic injection amount that is the fuel injection amount required when no fuel remains in an air intake passage of the engine when the engine is started up;

the injection amount operation means is configured so as to operate the fuel injection amount during start-up operation by performing a correction operation in which the start-up basic injection amount is multiplied by the correction coefficient; and the correction coefficient operation means is configured so that in cases where it has been judged from the engine stop information stored in the nonvolatile memory that the last engine stop is the intended stop, the correction coefficient is operated with respect to the engine temperature difference operated by the engine temperature difference operation means and a rotational speed on generation of the stop prediction information, the correction coefficient being operated so that the fuel injection amount during start-up operation becomes larger as the magnitude of the engine temperature difference is larger and the fuel injection amount during start-up operation becomes larger as the rotational speed on generation of the stop prediction information is higher, and is configured so that in cases where it has been judged from the engine stop information stored in the nonvolatile memory that the last engine stop was not the intended stop, the correction coefficient is operated with respect to both the engine temperature difference and the stopping engine rotational speed, the correction coefficient being operated so that the fuel injection amount during start-up operation becomes larger as the magnitude of the engine temperature difference is larger and the fuel injection amount during start-up operation becomes smaller as the stopping engine rotational speed is higher.

13. The fuel injection control device according to claim 1, wherein:

the fuel injection control device is provided with
- a stop prediction information detection means for detecting, as stop prediction information, an information generated only in cases where the state of the engine stop is the intended stop, a rotational speed detection means for detecting a rotational speed of the engine each time the engine rotates by a fixed angle, and
- an engine temperature detector for detecting a temperature of the engine;
- the engine stop prediction information acquisition means is configured so that when it is confirmed that the stop prediction information detection means has detected the stop prediction information before the engine stop, an information indicating that the current engine stop is the intended stop is stored in the nonvolatile memory as the engine stop information, and an information about an engine temperature at engine stop is also stored in the nonvolatile memory as the engine stop information, where the engine temperature at engine stop is engine temperature detected by the engine temperature detector when the engine is stopped, and is configured so that when it cannot be confirmed that the stop prediction information detection means has detected the stop prediction information before the engine stop, information indicating that the current engine stop is not the intended stop is stored in the nonvolatile memory as the engine stop information, and an information about an engine temperature at engine stop and a stopping engine rotational speed is also stored in the nonvolatile memory as the engine stop information, where the engine temperature at engine stop is a temperature detected by the engine temperature detector when the engine is stopped, and the stopping engine rotational speed is an engine rotational speed detected by the rotational speed detection means immediately before the engine stop;
- the injection amount determination means is provided with engine temperature difference operation means for operating an engine temperature difference by subtracting a temperature on start-up of the engine from the engine temperature at engine stop stored in the nonvolatile memory, an injection amount operation means for operating a fuel injection amount during start-up operation and a fuel injection amount during steady operation, and a correction coefficient operation means for operating a correction coefficient with respect to the engine temperature difference and/or the stopping engine rotational speed, where the correction coefficient is a proportion of the actual fuel injection amount at engine start-up relative to a start-up basic injection amount that is the fuel injection amount required when no fuel remains in an air intake passage of the engine when the engine is started up;
- the injection amount operation means is configured so as to operate the fuel injection amount during start-up operation by performing a correction operation in which the start-up basic injection amount is multiplied by the correction coefficient; and
- the correction coefficient operation means is configured so as to operate the correction coefficient with respect to the engine temperature difference in cases where it has been judged from the engine stop information stored in the nonvolatile memory that the last engine stop was the intended stop, the correction coefficient being operated so that the fuel injection amount during start-up operation becomes larger as the magnitude of the engine temperature difference operated by the engine temperature difference operation means is larger, and is configured so that in cases where it has been judged from the engine stopping state information that the last engine stop is not the intended stop, the correction coefficient is operated with respect to both the engine temperature difference and the stopping engine rotational speed so that the fuel injection amount during start-up operation becomes larger as the magnitude of the engine temperature difference is larger and the fuel injection amount during start-up operation becomes smaller as the stopping engine rotational speed is higher.

14. The fuel injection control device according to claim 1, wherein:

the fuel injection control device is provided with
- a stop prediction information detection means for detecting, as a stop prediction information, an information generated only in cases where the state of the engine stop is the intended stop,
- a rotational speed detection means for detecting a rotational speed of the engine each time the engine rotates by a fixed angle, and
- an engine temperature detector for detecting a temperature of the engine;
- the engine stop information acquisition means is configured so that when it is confirmed that the stop prediction information detection means has detected the stop prediction information before the engine stop, an information indicating that the current engine stop is the intended stop is stored in the nonvolatile memory as the engine stop information, and information about engine temperature at engine stop and an information about a stopping engine rotational speed are also stored in the nonvolatile memory as the engine stop information, where the engine temperature at engine stop is an engine temperature detected by the engine temperature detector when the engine is stopped, and the stopping engine rotational speed is engine rotational speed detected by the rotational speed detection means when the stop prediction information is detected by the stop prediction information detection means, and is configured so that when it cannot be confirmed that the stop prediction information detection means has detected the stop prediction information before the engine stop, an information indicating that the current engine stop is not the intended stop is stored in the nonvolatile memory as the engine stop information, and an information about an engine temperature at engine stop and a stopping engine rotational speed are also stored in the nonvolatile memory as the engine stop information, where the engine temperature at engine stop is a temperature detected by the engine temperature detector when the engine is stopped, and the stopping engine rotational speed is an engine rotational speed detected by the rotational speed detection means immediately before the engine stop;

the injection amount determination means is provided with an engine temperature difference operation means for operating an engine temperature difference by subtracting a temperature on start-up of the engine from the engine temperature at engine stop stored in the nonvolatile memory, an injection amount operation means for operating a fuel injection amount during start-up operation and a fuel injection amount during steady operation, and correction coefficient operation means for operating a correction coefficient with respect to the engine temperature difference and/or the stopping engine rotational speed, where the correction coefficient is a proportion of the actual fuel injection amount at engine start-up relative to a start-up basic injection amount that is the fuel injection amount required when no fuel remains in an air intake passage of the engine when the engine is started up;

the injection amount operation means is configured so as to operate the fuel injection amount during start-up operation by performing a correction operation in which the start-up basic injection amount is multiplied by the correction coefficient; and the correction coefficient operating means is configured so that in cases where it has been judged from the engine stop information stored in the nonvolatile memory that the last engine stop is the intended stop, the correction coefficient is operated with respect to the engine temperature difference operated by the engine temperature difference operation means, the correction coefficient being operated so that the fuel injection amount during start-up operation becomes larger as the magnitude of the engine temperature difference is larger, and is configured so that in cases where it has been judged from the engine stop information stored in the nonvolatile memory that the last engine stop was not the intended stop, the correction coefficient is operated with respect to both the engine temperature difference and the stopping engine rotational speed, the correction coefficient being operated so that the fuel injection amount during start-up operation becomes larger as the magnitude of the engine temperature difference is larger and the fuel injection amount during start-up operation becomes smaller as the stopping engine rotational speed is higher.

15. The fuel injection control device according to claim 14, wherein the correction amount operation means is configured so that: in cases where the last engine stop is the intended stop, the correction coefficient is set to a value other than 1 when neither a first condition nor a second condition is fulfilled, where the first condition is that the stopping engine rotational speed is equal to or greater than a threshold value for judging an appropriateness of executing correction of the fuel injection amount during start-up operation, and the second condition is that the engine temperature difference is equal to or greater than a first judgement value for judging the appropriateness of executing correction of the start-up fuel injection amount, but the correction coefficient is set to 1 when either of the first condition and the second condition is fulfilled; and in cases where the last engine stop is not the intended stop, the correction coefficient is set to a value other than 1 when a third condition is not satisfied, where the third condition is that the engine temperature difference is equal to or greater than a second judgement value for assessing the appropriateness of executing correction of the fuel injection amount, but the correction coefficient is set to 1 when the third condition is satisfied.

16. The fuel injection control device according to claim 3, wherein the stop prediction information detection means is configured so that an information indicating that an engine stop command which commands that the engine be stopped has been generated is used as the stop prediction information.

17. The fuel injection control device according to claim 3, wherein the stop prediction information detection means is configured so that an information indicating that an engine stop control has been activated is used as the stop prediction information, where the engine stop control is executed when the engine stop command commanding that the engine be stopped has been generated.

18. The fuel injection control device according to claim 16, wherein the engine stop command is generated due to manipulation of a switch for stopping the engine.

19. The fuel injection control device according to claim 16 wherein:

the fuel injection control device is provided with a protection control means that performs a protection control in which fuel cutting is performed to stop the engine in order to protect a specific object to be protected; and the stop prediction information detection means is configured so that an information indicating that the protection control has been activated is also used as the stop prediction information.

20. The fuel injection control device according to claim 15, wherein the stop prediction information detection means is configured so that an information indicating that a process for performing fuel cutting has started is used as the stop prediction information.

* * * * *